United States Patent
Sun et al.

(10) Patent No.: US 12,539,661 B2
(45) Date of Patent: Feb. 3, 2026

(54) INVERSE ORIGAMI DESIGN FOR SOFT ROBOTIC DEVELOPMENT

(71) Applicant: City University of Hong Kong, Kowloon (HK)

(72) Inventors: Dong Sun, Kowloon (HK); Qiqiang Hu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 572 days.

(21) Appl. No.: 17/992,518

(22) Filed: Nov. 22, 2022

(65) Prior Publication Data
US 2024/0165869 A1     May 23, 2024

(51) Int. Cl.
| | | |
|---|---|---|
| *B29C 53/04* | (2006.01) | |
| *B29C 53/00* | (2006.01) | |
| *B29K 67/00* | (2006.01) | |
| *B29L 31/00* | (2006.01) | |

(52) U.S. Cl.
CPC .......... *B29C 53/04* (2013.01); *B29C 53/005* (2013.01); *B29K 2067/003* (2013.01); *B29L 2031/748* (2013.01)

(58) Field of Classification Search
None
See application file for complete search history.

(56) References Cited

U.S. PATENT DOCUMENTS 9,706,646 B2    7/2017    Jiang et al.

FOREIGN PATENT DOCUMENTS

| | | |
|---|---|---|
| CN | 113071124 A | 7/2021 |
| CN | 113954367 A | 1/2022 |

OTHER PUBLICATIONS https://3dprint.com/98031/3d-printed-robogami/ (Year: 2015).*
Wang et al., "Folding to Curved Surfaces: A Generalized Design Method and Mechanics of Origami-Based Cylindrical Structures" Scientific Reports, vol. 6, No. 33312, 2016, pp. 1-10.
Hu et al., "Design of Cylindrical and Axisymmetric Origami Structures Based on Generalized Miura-Ori Cell", Journal of Mechanisms and Robotics, 2019, pp. 1-17.
Filipov et al., "Origami Tubes with Reconfigurable Polygonal Cross-Sections" The Royal Society, vol. 472, 2016, 23 pages.

(Continued)

*Primary Examiner* — Barbara J Musser
(74) *Attorney, Agent, or Firm* — Amin, Turocy & Watson, LLP

(57) ABSTRACT

Inverse origami design for soft robotic development is described herein. A method as described herein can include determining, by a system comprising a processor, shape parameters corresponding to an input shape; generating, by the system based on the shape parameters, an origami crease pattern representative of the input shape, wherein the origami crease pattern comprises respective origami cell units, and wherein the origami crease pattern is defined by a group of vector size parameters corresponding to relative fold lengths associated with the respective origami cell units, a vector angle parameter corresponding to fold angles associated with the respective origami cell units, and a scalar cell height parameter; and imprinting, by the system, the origami crease pattern onto a tangible medium.

20 Claims, 22 Drawing Sheets

(56) References Cited

OTHER PUBLICATIONS

Tachi, Tomohiro "Freeform Rigid-Foldable Structure Using Bidirectionally Flat-Foldable Planar Quadrilateral Mesh", Advances in Architectural Geometry, 2010, pp. 87-102.

Dang et al., "Inverse Design of Deployable Origami Structures That Approximate a General Surface", International Journal of Solids and Structures, 2022, pp. 234-235.

Hu et al., "Constructing Rigid-Foldable Generalized Miura-Ori Tessellations for Curved Surfaces," Journal of Mechanisms and Robotics, arxiv:2006.04070v2, 2020, 17 pages.

Santoso et al., "An Origami Continuum Robot Capable of Precise Motion Through Torsionally Stiff Body and Smooth Inverse Kinematics," Soft Robotics, vol. 00, No. 00, 2020, 16 pages.

Onal et al., "An Origami-Inspired Approach to Worm Robots," IEEE/ASME Transactions on Mechatronics, vol. 18, No. 2, Apr. 2013, 9 pages.

Rus et al., "Design, fabrication and control of origami robots," Nature Reviews Materials, vol. 3, No. 6, pp. 101-112, 2018, 12 pages.

Liu et al., "Micrometer-sized electrically programmable shape-memory actuators for low-power microrobotics," Science Robotics, vol. 6, No. 52, 2021, 10 pages.

Melancon et al., "Multistable inflatable origami structures at the metre scale," Nature, vol. 592, No. 7855, pp. 545-550, 2021, 7 pages.

Rus et al., "Spotlight on origami robots," Science Robotics, vol. 3, No. 15, 2018, 3 pages.

Luo et al., "OriSnake: Design, Fabrication, and Experimental Analysis of a 3-D Origami Snake Robot," IEEE Robotics and Automation Letters, vol. 3, No. 3, pp. 1993-1999, 2018, 7 pages.

Baek et al., "Ladybird beetle-inspired compliant origami," Science Robotics, vol. 5, No. 41, 2020, 11 pages.

Kim et al., "Morphing origami block for lightweight reconfigurable system," IEEE Transactions on Robotics, vol. 37, No. 2, pp. 494-505, 2021, 12 pages.

Miyashita et al., "Robotic metamorphosis by origami exoskeletons," Science Robotics, vol. 2, No. 10, 2017, 31 pages.

Felton et al., "A method for building self-folding machines," Science, vol. 345, No. 6197, pp. 644-646, 2014, 4 pages.

Lee et al., "TWISTER Hand: Underactuated robotic gripper inspired by origami twisted tower," IEEE Transactions on Robotics, vol. 36, No. 2, pp. 488-500, 2020, 13 pages.

Orlofsky et al., "Mechanically programmed miniature origami grippers," IEEE International Conference on Robotics and Automation (ICRA), pp. 2872-2878, Paris, France, 2020, 7 pages.

Lee et al., "Origami-based vacuum pneumatic artificial muscles with large contraction ratios," Soft Robotics, vol. 6, No. 1, pp. 109-117, 2019, 9 pages.

Li et al., "Fluid-driven origami-inspired artificial muscles," Proceedings of the National Academy of Sciences, vol. 114, No. 50, pp. 13132-13137, 2017, 6 pages.

Cai et al., "Geometric design and mechanical behavior of a deployable cylinder with Miura origami," Smart Materials and Structures, vol. 24, No. 12, 2015, 15 pages.

Gattas et al., "Miura-base rigid origami: Parameterizations of first-level derivative and piecewise geometries," Journal of Mechanical Design, vol. 135, No. 11, pp. 111011, 2013, 11 pages.

Chen et al., "Origami of thick panels," Science, vol. 349, No. 6246, pp. 396-400, 2015, 11 pages.

Jianguo et al., "Bistable behavior of the cylindrical origami structure with kresling pattern," Journal of Mechanical Design, vol. 137, No. 6, 2015, 8 pages.

Zhou et al., "Design of three-dimensional origami structures based on a vertex approach," Proceedings of the Royal Society A: Mathematical, Physical and Engineering Sciences, vol. 471, No. 2181, 2015, 18 pages.

Dudte et al., "Programming curvature using origami tessellations," Nature Materials, vol. 15, No. 5, pp. 583-588, 2016, 17 pages.

Lang et al., "A computational algorithm for origami design," Proceedings of the twelfth annual symposium on Computational geometry, pp. 98-105, 1996, 8 pages.

Tachi, "Origamizing polyhedral surfaces," IEEE Trans Vis Comput Graph, vol. 16, No. 2, pp. 298-311, 2010, 14 pages.

Kamrava et al., "Programmable origami strings," Advanced Materials Technologies, vol. 3, No. 3, 2018, 9 pages.

Chen et al., "A programmably compliant origami mechanism for dynamically dexterous robots," IEEE Robotics and Automation Letters, vol. 5, No. 2, pp. 2131-2137, 2020, 7 pages.

Zuliani et al., "Minimally actuated transformation of origami machines," IEEE Robotics and Automation Letters, vol. 3, No. 3, pp. 1426-1433, 2018, 8 pages.

Sareh et al., "Rotorigami: A rotary origami protective system for robotic rotorcraft," Science Robotics, vol. 3, No. 22, 2018, 13 pages.

Kamrava et al., "Origami-based cellular metamaterial with auxetic, bistable, and self-locking properties," Sci Rep, vol. 7, 2017, 9 pages.

Gu et al., "Soft wall-climbing robots," Science Robotics, vol. 3, No. 25, 2018, 14 pages.

Qin et al., "A versatile soft crawling robot with rapid locomotion," Soft Robotics, vol. 6, No. 4, pp. 455-467, 2019"A versatile soft crawling robot with rapid locomotion," Soft Robotics, vol. 6, No. 4, pp. 455-467, 2019, 13 pages.

Cao et al., "Untethered soft robot capable of stable locomotion using soft electrostatic actuators," Extreme Mechanics Letters, vol. 21, pp. 9-16, 2018, 17 pages.

Liao et al., "Soft rod-climbing robot inspired by winding locomotion of snake," Soft Robotics, vol. 7, No. 4, pp. 500-511, 2020, 12 pages.

Robertson et al., "New soft robots really suck: Vacuum-powered systems empower diverse capabilities," Science Robotics, vol. 2, No. 9, 2017, 27 pages.

Silverberg et al., "Using origami design principles to fold reprogrammable mechanical metamaterials," Science, vol. 345, No. 6197, pp. 647-650, 2014, 5 pages.

Shintake et al., "Soft robotic grippers," Advanced Materials, vol. 30, No. 29, 2018, 34 pages.

Hu et al., "Soft gripper design based on the integration of flat dry adhesive, soft actuator, and microspine," IEEE Transactions on Robotics, vol. 37, No. 4, pp. 1065-1080, 2021, 16 pages.

Larabee et al., "Performance, morphology and control of power-amplified mandibles in the trap-jaw ant Myrmoteras (*Hymenoptera formicidae*)," J Exp Biol, vol. 220, No. 17, 2017, 10 pages.

Jones et al., "Biology and life tables for the predaceous earwig, Doru taeniatum [Derm.: Forficulidae]," Entomophaga, vol. 33, No. 1, pp. 43-54, 1988, 12 pages.

Ruffatto et al., "Increasing the adhesion force of electrostatic adhesives using optimized electrode geometry and a novel manufacturing process," Journal of Electrostatics, vol. 72, No. 2, pp. 147-155, 2014, 9 pages.

Graule et al., "Perching and takeoff of a robotic insect on overhangs using switchable electrostatic adhesion," Science, vol. 352, No. 6288, pp. 978-982, 2016, 12 pages.

De Rivaz et al., "Inverted and vertical climbing of a quadrupedal microrobot using electroadhesion," Science Robotics, vol. 3, No. 25, 2018, 13 pages.

\* cited by examiner

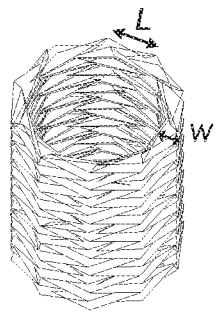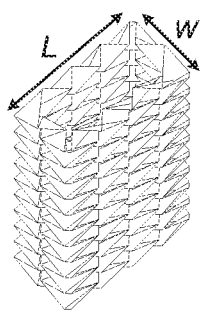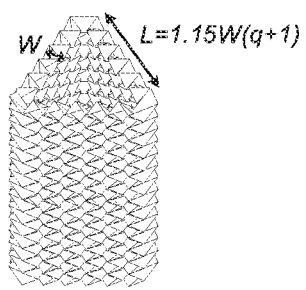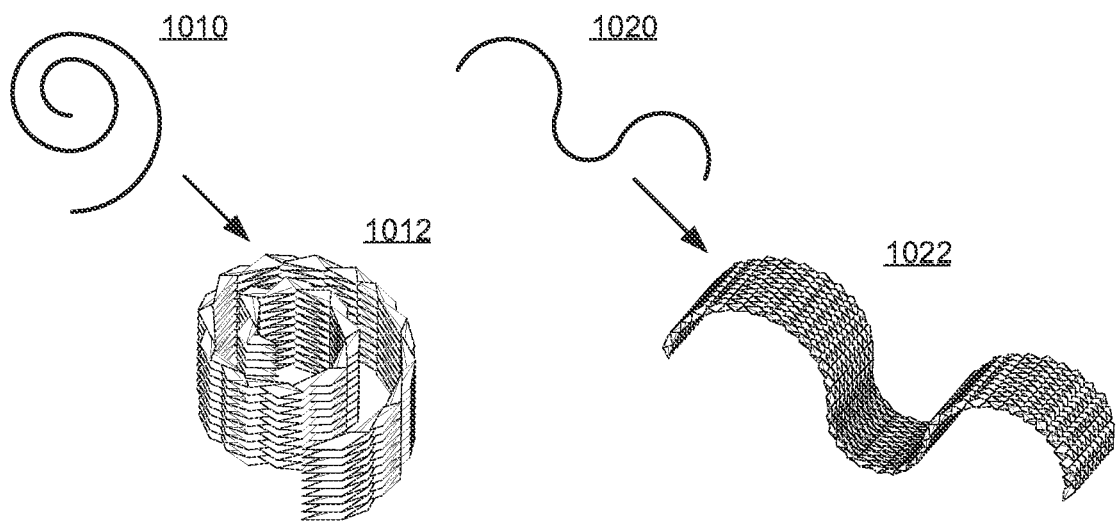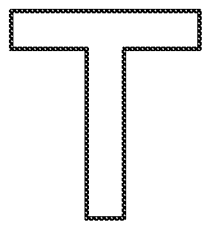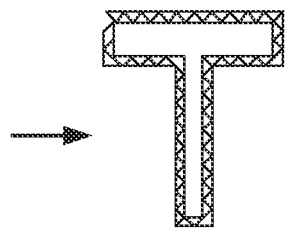
FIG. 10

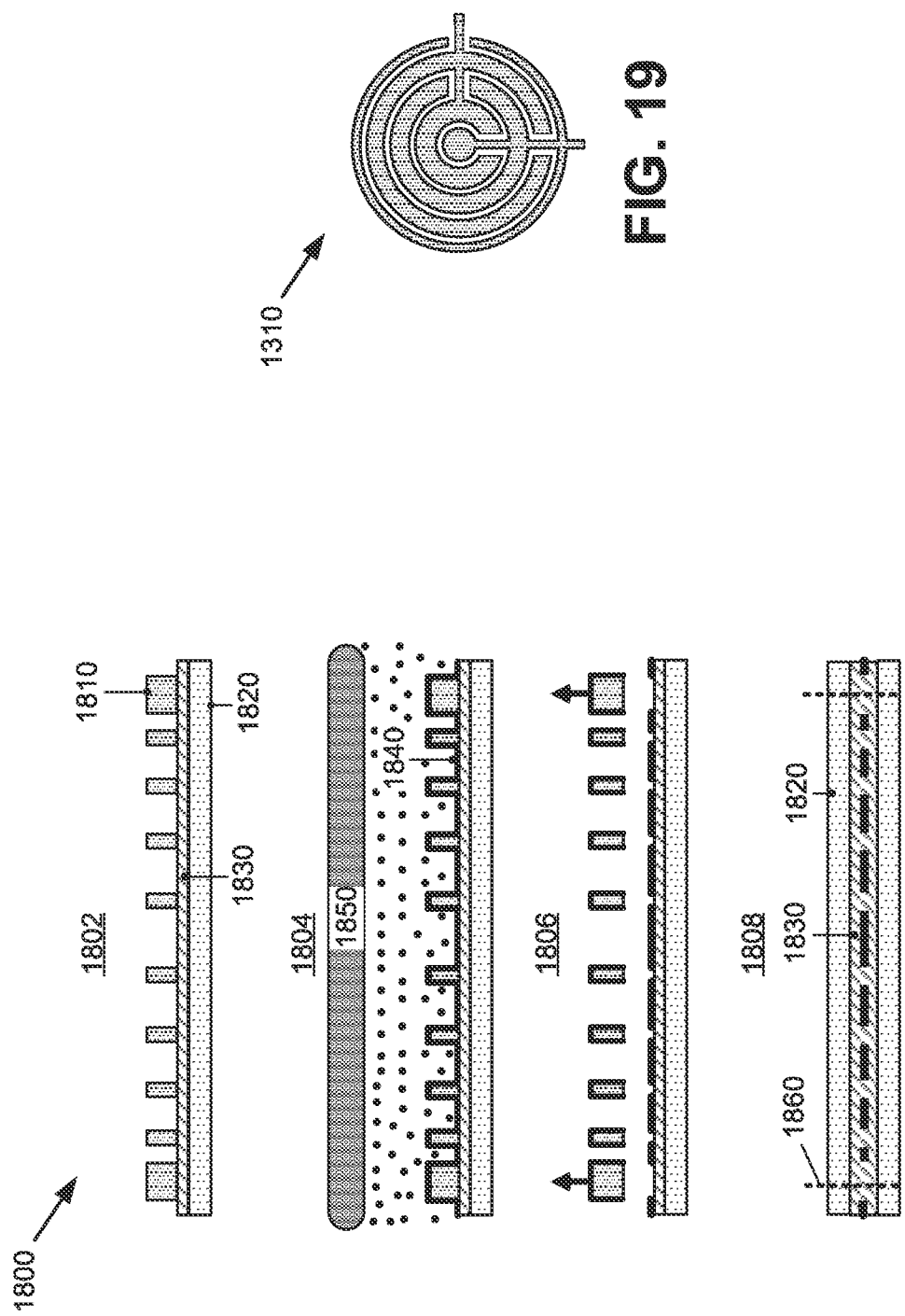

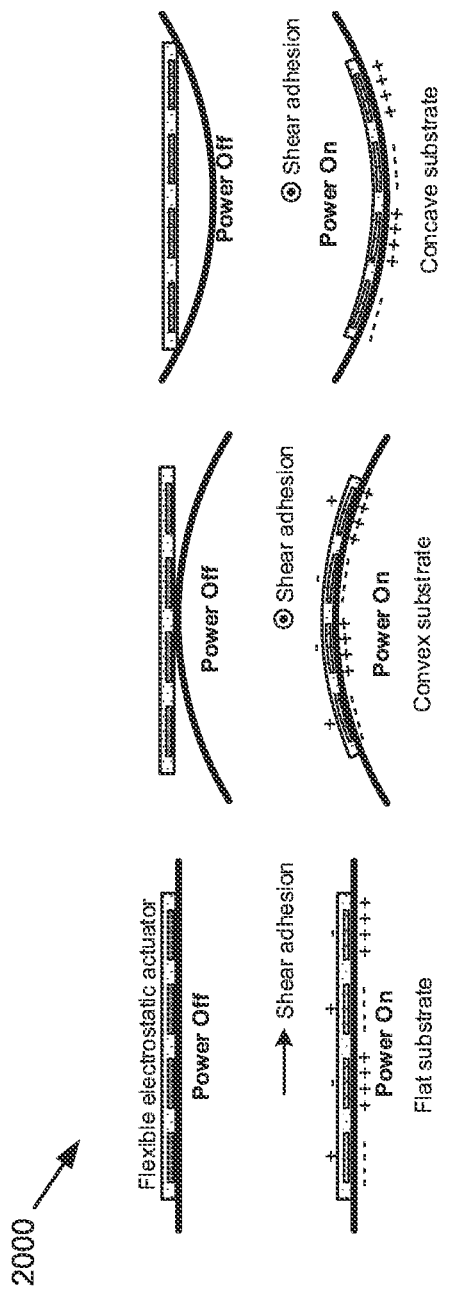

INVERSE ORIGAMI DESIGN FOR SOFT ROBOTIC DEVELOPMENT

BACKGROUND

Origami, originally from the ancient art of paper folding, can be used to construct various three-dimensional (3D) structures with different shapes and sizes from a flat sheet. The resulting 3D structures can have selective compliance and reversible features between the flat and 3D forms. Three-dimensional origami structures can be made from a wide range of materials and enable functional folds, with stiffness ranging from soft to rigid, by processing a flat sheet with specific crease patterns.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a method is described herein. The method can include determining, by a system including a processor, shape parameters corresponding to an input shape. The method can further include generating, by the system based on the shape parameters, an origami crease pattern representative of the input shape. The origami crease pattern can include respective origami cell units, and the origami crease pattern can be defined by a group of vector size parameters corresponding to relative fold lengths associated with the respective origami cell units, a vector angle parameter corresponding to fold angles associated with the respective origami cell units, and a scalar cell height parameter. The method can additionally include imprinting, by the system, the origami crease pattern onto a tangible medium.

In another implementation, a system is described herein. The system can include a processor and a memory that stores executable instructions that, when executed by the processor, facilitate performance of operations. The operations can include determining properties of a target shape; generating, based on the properties, an origami crease pattern representative of the target shape, the origami crease pattern including respective origami cell units and being defined by a group of first vector parameters corresponding to relative fold lengths of the origami cell units, a second vector parameter corresponding to fold angles of the origami cell units, and a scalar parameter corresponding to a height of the origami cell units; and rendering the origami crease pattern onto a tangible sheet.

In an additional implementation, a non-transitory machine-readable medium including computer executable instructions is described herein. The instructions, when executed by a processor, can facilitate performance of operations including generating, based on properties of an input shape, an origami crease pattern representative of the input shape, where the origami crease pattern includes respective origami cell units, and where the origami crease pattern is defined by parameters including a group of vector length parameters corresponding to relative fold lengths of the respective origami cell units, a vector angle parameter corresponding to fold angles associated with the respective origami cell units, and a scalar cell dimension parameter that defines a spatial dimension of the respective origami cell units; and imprinting the origami crease pattern onto a tangible sheet.

DESCRIPTION OF DRAWINGS

Various non-limiting embodiments of the subject disclosure are described with reference to the following figures, wherein like reference numerals refer to like parts throughout unless otherwise specified.

FIG. 10 is a diagram depicting respective origami shapes that can be constructed using the inverse origami design model of FIG. 6.

FIG. 18 is a diagram depicting respective fabrication steps for a flexible electrostatic actuator in accordance with various implementations described herein.

FIGS. 19-20 are diagrams depicting respective aspects of a flexible electrostatic actuator that can be constructed according to the fabrication steps shown in FIG. 18.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter. In addition, it is noted that the drawings provided herein are not drawn to scale, either within the same drawing or between different drawings, unless explicitly stated otherwise.

Described herein are techniques that facilitate inverse origami design for soft robot development. Traditionally, developing a robot involves the design of 3D functional structures and finding suitable 3D manufacturing methods. These manufacturing methods are usually bottom-up, with complicated steps and limited scale in implementation. In contrast, origami facilitates a top-down manufacturing method, e.g., in which a 3D structure can be deployed to a 2D plane. This can remarkably decrease manufacturing complexity, shorten the production cycle of origami-inspired robots, and allow the use of mechanical meta-materials with different features of drivability, tunable stiffness, and bi-stability, among other benefits.

Difficulties in developing soft origami robots lie in the design of flat crease patterns to achieve desired 3D origami structures. Existing origami design techniques typically involve manual iterative modification of a crease pattern until the final desired folded shape is obtained, which increases the complexity of origami design and hinders the mass production of corresponding designed robots. As a result, traditional 3D model design, e.g., that utilizes software to generate desired solid structures by inputting simple commands, are generally used in practice. Various aspects described herein facilitate automatic generation of flat crease patterns based on a desired folded shape, which significantly mitigates and/or removes these difficulties.

Figure 1:
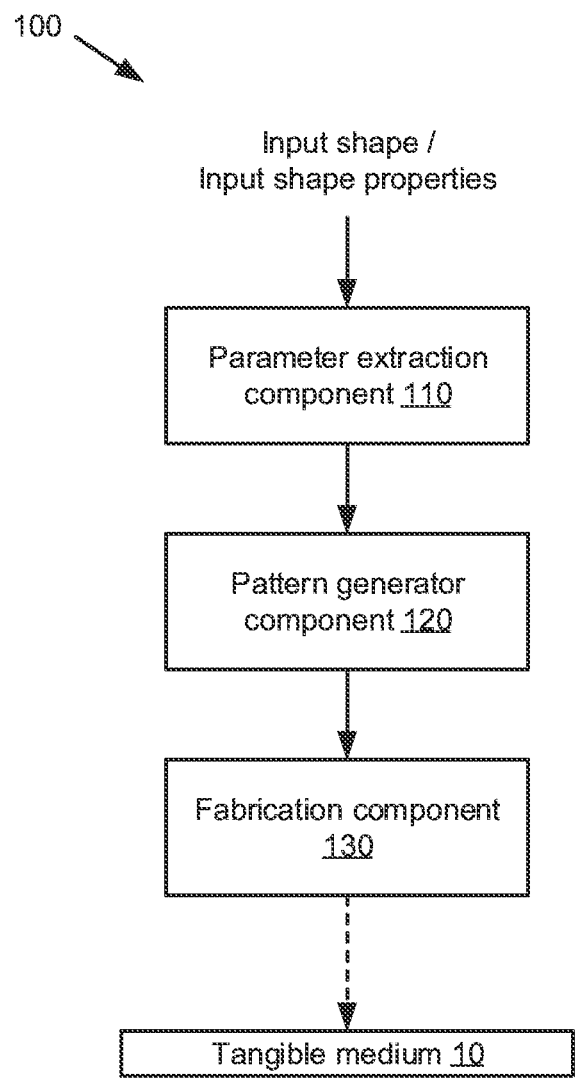
FIG. 1 is a block diagram of a system that facilitates inverse origami design for soft robotic development in accordance with various implementations described herein.

With reference now to the drawings, FIG. 1 illustrates a block diagram of a system 100 that facilitates inverse origami design for soft robotic development. As shown in FIG. 1, system 100 includes a parameter extraction component 110, a pattern generator component 120, and a fabrication component 130, which can operate as described in further detail below. In an implementation, the components 110, 120, 130 of system 100 can be implemented in hardware, software, or a combination of hardware and software. By way of example, the components 110, 120, 130 can be at least partially implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 29.

The parameter extraction component 110 of system 100 can determine parameters and/or other properties of a target shape, e.g., based on a representation of the shape and/or its properties provided as input to the parameter extraction component 110. In various implementations, the parameter extraction component 110 can determine different sets of parameters based on a type of the input shape. For example, the parameter extraction component 110 can determine shape parameters based on whether the target shape is a triangle, quadrangle, or regular polygon, e.g., as described below with respect to FIGS. 6-8.

Based on shape parameters as generated by the parameter extraction component 110, the pattern generator component 120 of system 100 can produce an origami crease pattern that is representative of the input shape associated with the shape parameters. An origami crease pattern as generated by the pattern generator component 120 can be expressed as, or otherwise include, a group of origami cell units, e.g., Miura cell units as described below with respect to FIG. 3. Additionally, an origami crease pattern as created by the pattern generator component 120 can be based on an inverse origami design model that defines the crease pattern based on a group of parameters. These parameters can include, e.g., a group of vector length or size parameters that correspond to respective fold lengths associated with the respective origami cell units, a vector angle parameter that corresponds to fold angles associated with the respective origami cell units, and a scalar cell height or cell dimension parameter that is based on a desired final size of the folded origami shape. These parameters and their derivation are described in further detail below, e.g., with respect to FIG. 6.

In response to generation of an origami crease pattern by the pattern generator component 120, the fabrication component 130 of system 100 can imprint and/or otherwise render the origami crease pattern onto a tangible medium 10, e.g., a flat sheet composed of one or more materials, a layered group of flat sheets, etc. By way of non-limiting example, the fabrication component 130 can print the origami crease pattern onto a paper sheet, etch the origami crease pattern into a sheet composed of polyethylene terephthalate (PET) and/or other plastics, and/or facilitate transferal of the pattern onto the tangible medium 10 in any other suitable manner Techniques that can be utilized by the fabrication component 130 are described in further detail below, e.g., with respect to FIG. 11.

Various implementations presented herein utilize an inverse origami design model using standard patterns, e.g., Miura origami patterns, with widespread robotic applications to promote the development of soft origami robots. With this model, desired origami structures and corresponding crease patterns can be generated simply on the basis of input shape parameters or 2D shape graphics. Additionally, users can easily process resulting origami designs to obtain the flat crease patterns of desired folded shapes. Furthermore, this model can be incorporated into a user-friendly software platform for easy implementation, e.g., as will be described in further detail below with respect to FIG. 27. With this platform, various soft origami robots with crawling, actuation, and grasping functions can be constructed by integrating with soft smart actuators.

Figure 2:
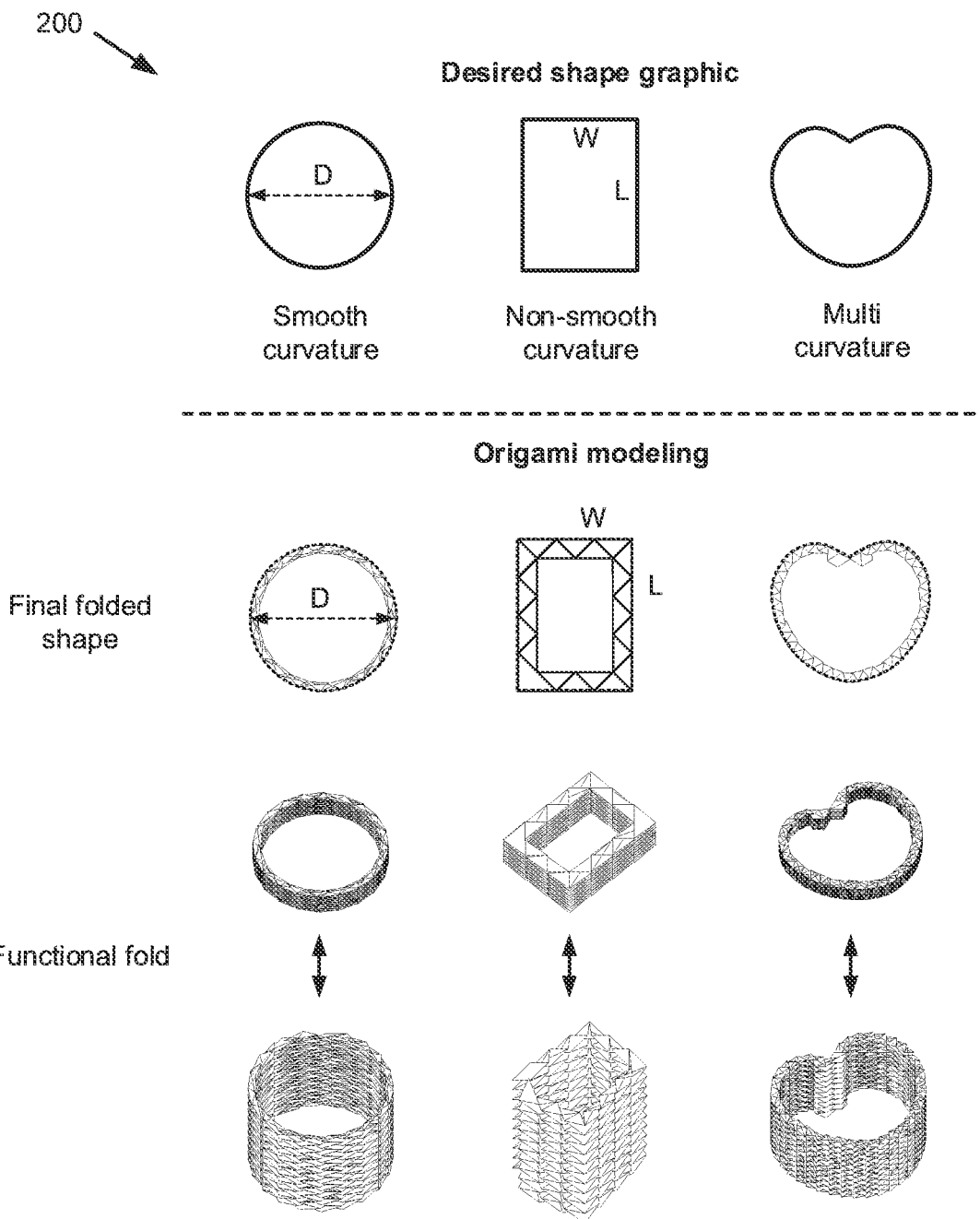
FIG. 2 is a diagram depicting origami designs that can be generated for given input shapes in accordance with various implementations described herein.

The design model presented herein can be used to construct origami structures with various cross sectional shapes in a simple manner while allowing the generated origami structures to be axially foldable by stacking layers, as shown in diagram 200 of FIG. 2. In contrast to traditional 3D modeling, which obtains solid structures by extruding from desired shape graphics, inverse origami modeling as provided herein can generate 3D foldable structures from graphics corresponding to a desired shape. The resulting foldable structures can be utilized, e.g., in developing soft functional robots by integrating with soft smart actuators.

Inverse Origami Design Model

Figure 3:
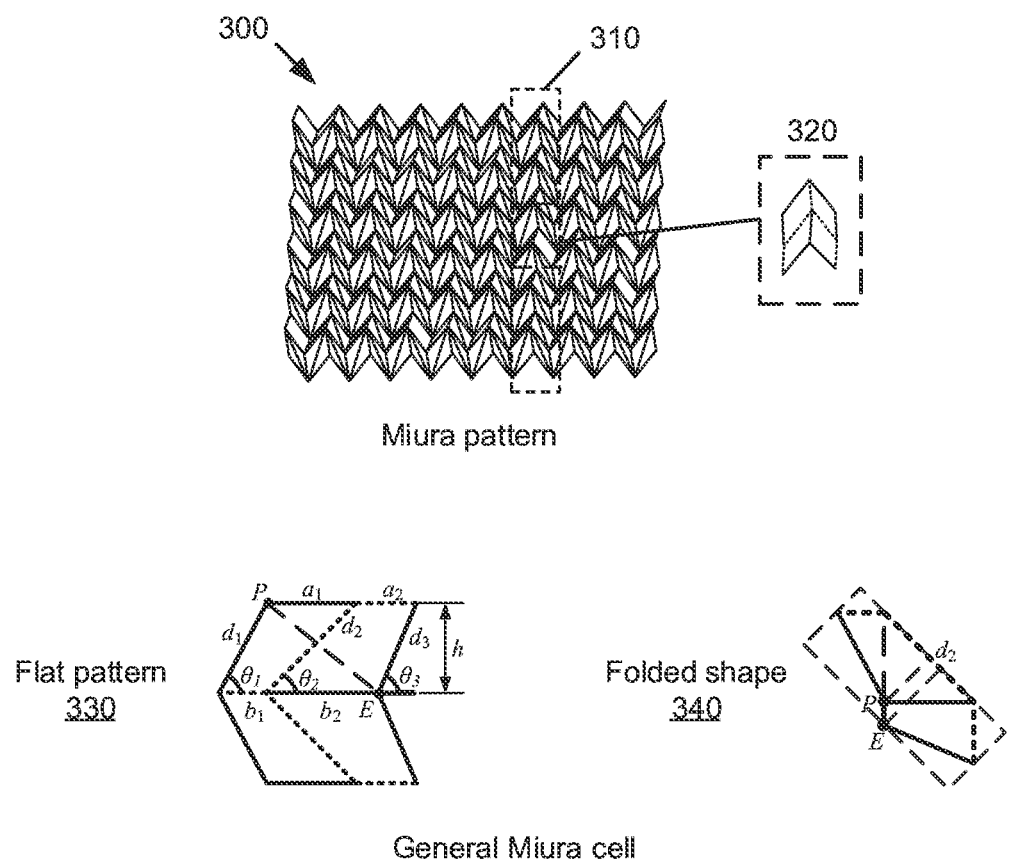
FIG. 3 is a diagram depicting example origami cell units that can be utilized in accordance with various implementations described herein.

Turning now to FIG. 3, a multilayer Miura origami pattern 300 with a uniform cell structure is shown. The pattern 300 is composed of respective layers 310, and each of the layers 310 are in turn composed of respective origami cells (cell units) 320. The pattern 300 shown in FIG. 3 presents a planar shape with mountain and valley folds, which can be axially compressed with a negative Poisson ratio. As used herein, solid and dotted lines represent the mountain and valley folds of a crease pattern, respectively. Origami with other nonplanar shapes can be made by modifying the flat crease pattern consisting of mountain and valley folds.

FIG. 3 further depicts a flat crease pattern 330 corresponding to a Miura cell unit as well as a folded shape 340 resulting from application of the crease pattern. In an implementation, an inverse origami design model can determine how to combine different crease patterns for given desired folded shapes. As used herein, a general cell can be abstracted with five basic parameters [h, a, b, d, θ] by generalizing the structure of a single cell 320 of the pattern 300, where a, b, d, and θ are vector parameters that define the sizes and angles of the mountain and valley folds, and h is a scalar that defines the half-height of the cell, as shown by the flat pattern 330 in FIG. 3. Each general cell can have an axisymmetric crease pattern with a constant h to maintain the axial compressibility of the multilayer origami.

Figure 4:
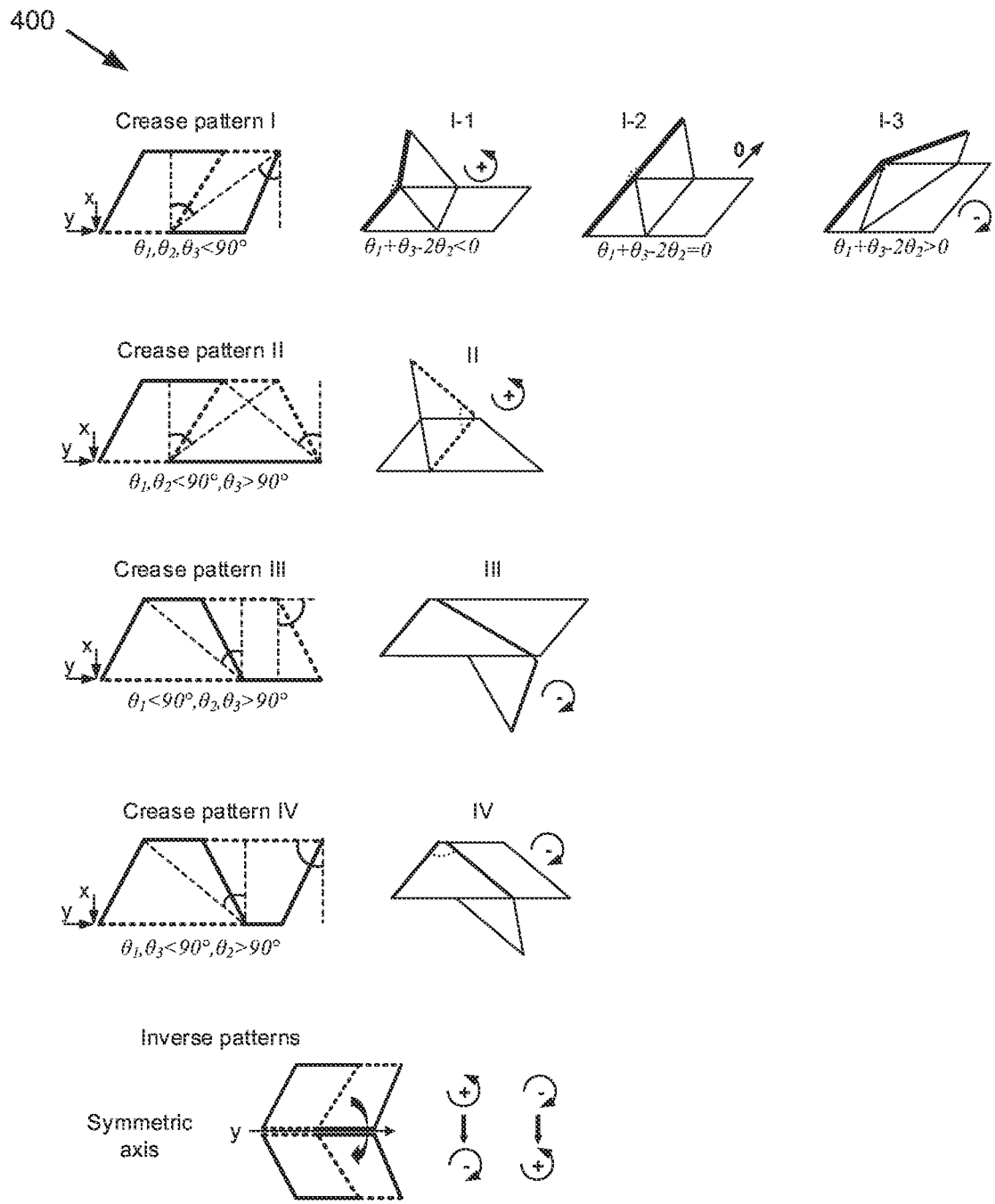
FIGS. 4-5 are diagrams depicting example origami crease patterns that can be utilized in accordance with various implementations described herein.

Turning next to FIG. 4, diagram 400 shows the possible configurations (folded shapes) of a general cell, e.g., a cell 320, based on the flat crease patterns. In accordance with the difference among three adjacent angles θ (e.g., $\theta_1$, $\theta_2$, and $\theta_3$), a general cell can have four types of basic crease patterns, resulting in different shape morphing. Only half of the crease pattern is shown in diagram 400 due to the symmetry of the general cell. A 3D reference system for each of the crease patterns is established in the lower-left corner, and the right-hand rule is used to describe the orientation of the final folded shape. Additionally, the arcs shown with each of the crease patterns represent the limited variation range of angles $\theta_2$ and $\theta_3$, respectively from left to right.

For crease pattern I, where $\theta_1$, $\theta_2$, and $\theta_3$ are less than 90°, three possible folded shapes rely on the value of $\theta_1+\theta_3-2\theta_2$. These shapes have different folded directions, such as counter-clockwise fold (I-1), parallel fold (I-2), and clockwise fold (I-3). The counter-clockwise fold is defined to be positive in accordance with the right-hand rule, and the parallel fold is considered zero. Crease pattern II, where $\theta_1$, $\theta_2<90°$ and $\theta_3>90°$, has a positive folded direction, and crease patterns III ($\theta_1<90°$ and $\theta_2$, $\theta_3>90°$) and IV ($\theta_1$, $\theta_3<90°$, and $\theta_2>90°$) have a negative folded direction.

On the basis of the four basic crease patterns shown in diagram 400, the single general cell can also have two categories of transformative crease patterns, e.g., mutual replacement of mountain and valley folds and inverse crease patterns symmetrical about the y-axis. The former has no change in folded direction, and the latter has a folded direction opposite the non-transformative crease patterns. An origami with a nonplanar shape can be produced by combining these crease patterns in series.

Figure 5:
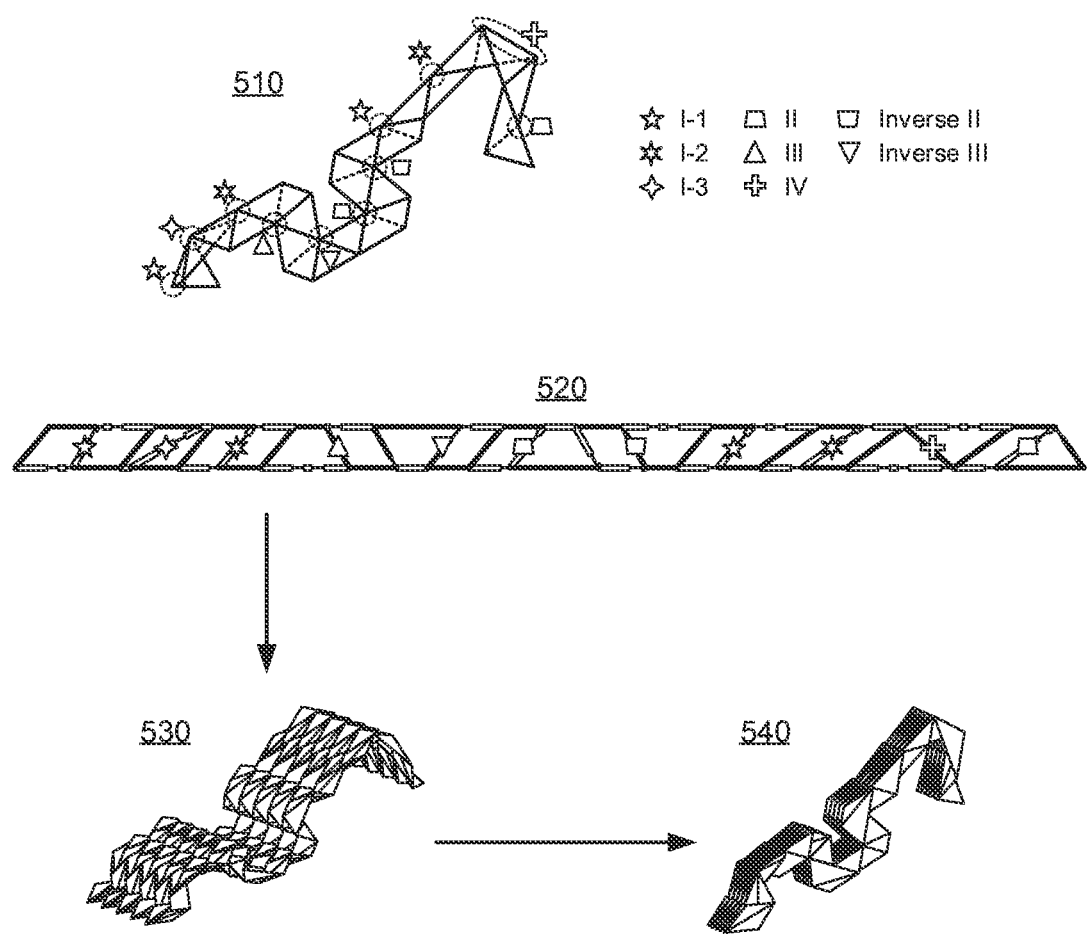

Referring next to FIG. 5, a nonplanar origami example including multiple crease patterns is illustrated. More particularly, FIG. 5 illustrates a final folded shape 510 resulting from a flat crease pattern 520 based on folding operations shown by 530 and 540. As shown in FIG. 5, the difference in the folded direction of respective crease patterns can greatly affect the growth direction of the final folded shape 510, following the analysis results described above with respect to FIG. 4. The used types of crease patterns are marked in the flat origami pattern 520 and the final folded origami 510. Two folds, namely, the first shaping fold that produces the initial folded shape and the second functional fold that allows the origami to fold and unfold with a stiffness between the initial and final folded shapes, are usually found in the origami morphing. An origami structure with five layers based on the flat origami pattern 520 is shown by 530 and 540.

In an implementation, different crease patterns can automatically be combined to form a final desired folded shape, e.g., after determining the possible crease patterns and folded directions of each cell. As described above with respect to FIGS. 3-5, a model can be used in which basic parameters [h, a, b, d, θ] can uniquely define a flat origami pattern. As a result, a desired folded shape can be constructed using only the corresponding parameters [h, a, b, d, θ] of the origami pattern in the inverse design model. As described below, mathematical parameters can be used to describe the desired folded shape in the inverse design model, thereby providing parametrical inputs for calculating the corresponding [h, a, b, d, θ].

Figure 6:
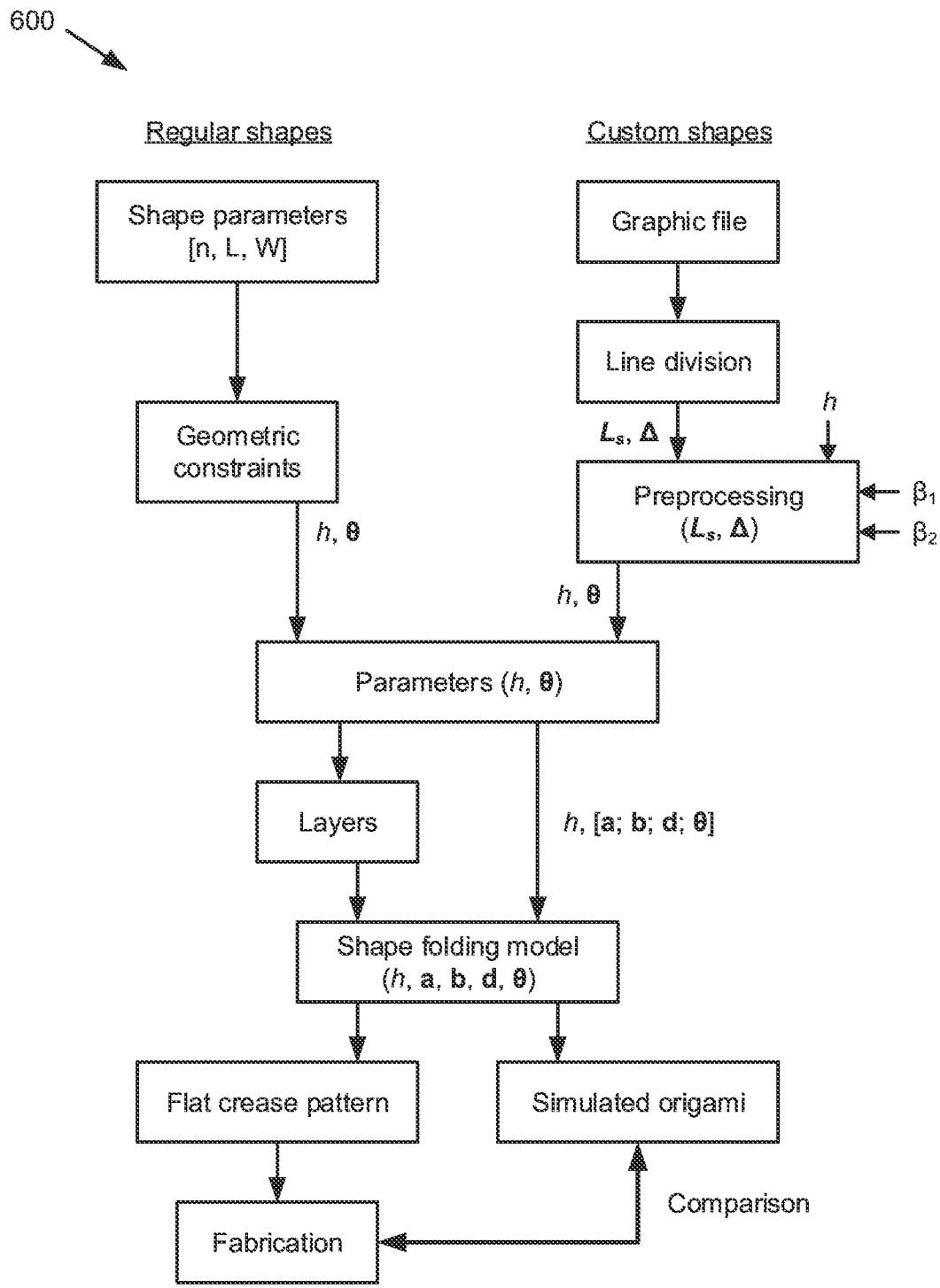
FIG. 6 is a diagram depicting operation of an example inverse origami design model in accordance with various implementations described herein.

Diagram 600 in FIG. 6 illustrates an example framework of an inverse origami design model that can be used to solve the above problem. As shown in diagram 600, two different routes can be used for designing desired regular and custom folded shapes. For regular shapes, shape parameters [n, L, W] can be used to define a regular desired folded shapes directly, where n is the number of sides, W is the width or thickness of each side, and L is the side length. When n=3, a positive integer q rather than L can be used as an input parameter to define the side length of the desired shape for easy use of the model, where L=1.15W(q+1). This derivation is described in further detail below with respect to FIG. 7.

Further in the example of a regular shape, the parameters [h, v] can be calculated from [n, L, W] based on geometric properties or constraints, such as P and E coincidence, e.g., corresponding to the points P and E shown in the folded shape 340 in FIG. 3, and equal thickness of the sides. The parameter θ can be based on the growth orientation of the desired folded shape and determine type(s) of crease patterns used, e.g., based on diagram 400 in FIG. 4. Subsequently, a first algorithm, shown in Table 1 below, can be used to solve [a, b, d] to well match the size of the desired shape.

Alternatively, for an irregular custom folded shape such as a spiral or wave, continuous line segments can initially be used to divide and fit the curve shape. The length $L_s$ of line segments and the angles Δ between adjacent line segments are generated as the vectoring parameters of [$L_s$, Δ] to define such a nonregular shape. A second algorithm, shown in Table 2 below, can be used to optimize the combination of different crease patterns and solve θ on the basis of the adjustable built-in parameters of $\beta_1$ and $\beta_2$. When Δ>$\beta_1$ or <$\beta_2$, different crease patterns, such as II or III as shown in diagram 400, can be used to better construct the origami shape. Here, the algorithm shown in Table 1 below can be used to calculate other parameters [a, b, d].

A universal shape folding model with parametrical input of [h, a, b, d, θ] can then be established, e.g., as described below with respect to FIG. 9, after obtaining the five basic parameters to generate a corresponding flat crease pattern. This flat crease pattern can include mountain and valley folds for subsequent fabrication. The shape folding model can also simulate the origami morphing that guides the actual fold of the fabricated origami pattern. On the basis of the inverse origami design model, a user-friendly software interface can also be used to assist users with or without origami experiences in using this model to design the origami with desired shapes and sizes, e.g., as described below with respect to FIG. 27.

TABLE 1 example algorithm for producing size parameters d, a, and b.

```
Input: h, θ
Output: d, a, and b
function Parameters (h, θ)
    for odd i = 1 → length(θ)-1 do           // Constraint: P coincides with E
        d_i = h / sin(θ_i); a_i = | h / sin(2θ_i+1) |; b_i = a_i - d_i · sin(θ_i - θ_{i+1}) / sinθ_{i+1}
    end for
    for even i = 2 → length(θ)-1 do
        d_i = h / sin(θ_i); b_i = | h / sin(2θ_i+1) |; a_i = b_i + d_i · sin(θ_i - θ_{i+1}) / sinθ_{i+1}
    end for
    for i = 2 → length(θ)-1 do               // Invalid situation: Ensure no interference
        if (θ_i >90° and θ_{i+1} <90°) then   // after complete folding
            a_i = b_{i-1} + b_{i+1}; b_i = a_i - d_i · sin(θ_i - θ_{i+1}) / sinθ_{i+1}
        else if (θ_i <90° and θ_{i+1} >90°) then
            b_i = a_{i-1} + a_{i+1}; a_i = b_i + d_i · sin(θ_i - θ_{i+1}) / sinθ_{i+1}
        end if
        if (a_i < 0) then                    // Check whether a and b have negative values
            b_i = b_i - a_i; a_i = 0
        else if (b_i < 0) then
            a_i = a_i - b_i; b_i = 0
        end if
    end for
    return d, a, b                           // Output parameters of a, b, d
end function
```

TABLE 2

Example algorithm for mixing crease patterns to improve shape construction.

```
Input: h, L_S, Δ
Output: θ
function Preprocessing (L_S, Δ)
    j = 0;
    for odd i = 1 → 2×length(Δ)+1 do
        j=j+1; θ_j = arcsin[ h / L_S(i) ] ×180 / π;
    end for
    j = 0;
    for even i = 2 → length(Δ)-1 do          // Preprocess the angle Δ with crease pattern I
        j=j+1; θ_j = (180 -Δ_j + θ_{i-1} + θ_{i+1}) / 2;
    end for
    for i = 1 → length(Δ) do
        if (Δ_i >β_1) then                   // Replace with crease pattern III or inverse II
            for odd j = 2i+1→ 2×length(Δ)+1       // when Δ > threshold β_1
                θ_j = 180 - θ_j;
            end for
            θ_{2i} = (360 -Δ_i + θ_{2i-1} + θ_{2i+1}) / 2;
            for even j = 2i+2→ 2×length(Δ)+1     // Correction of folding direction due to inverse
                θ_j = 180 - (180 + Δ_{j/2} - θ_{j-1} - θ_{j+1}) / 2;    // pattern caused by the supplementary angle
            end for
        else if (Δ_i < β_2) then             // Replace with crease pattern II or inverse III
            for odd j = 2i+1→ 2×length(Δ)+1       // when Δ < threshold β_2
                θ_j = 180 - θ_j;
            end for
            θ_{2i} = (θ_{2i-1} + θ_{2i+1} -Δ_i ) / 2;
            for even j = 2i+2→ 2×length(Δ)+1     // Correction of folding direction due to inverse
                θ_j = 180 - (180 + Δ_{j/2} - θ_{j-1} - θ_{j+1}) / 2;    // pattern caused by the supplementary angle
            end for
        end if
    end for
    return θ                                 Output parameters of θ
end function
```

Figure 7:
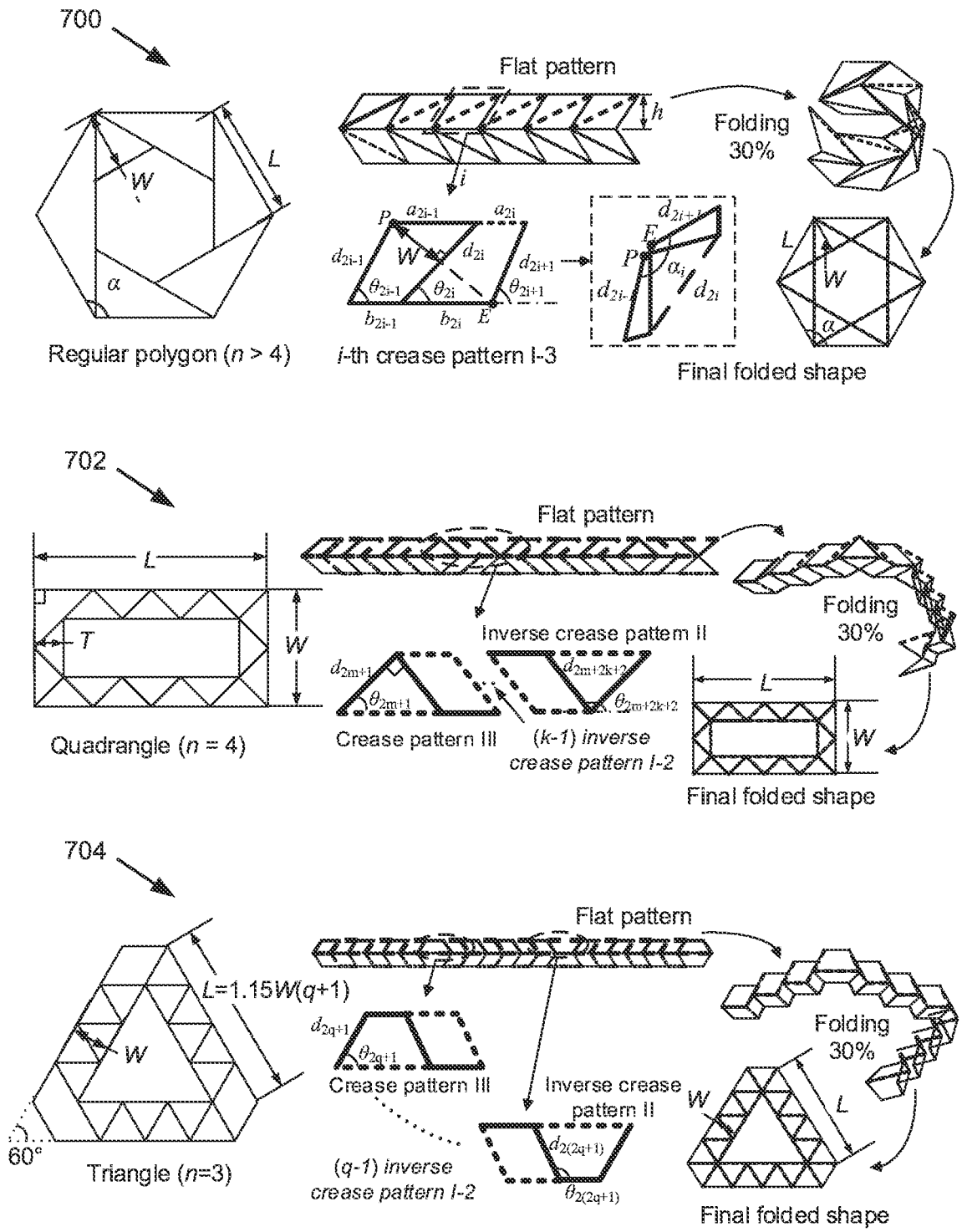
FIGS. 7-9 are diagrams depicting graphical representations of respective operations of the inverse origami design model of FIG. 6.
Figure 8:
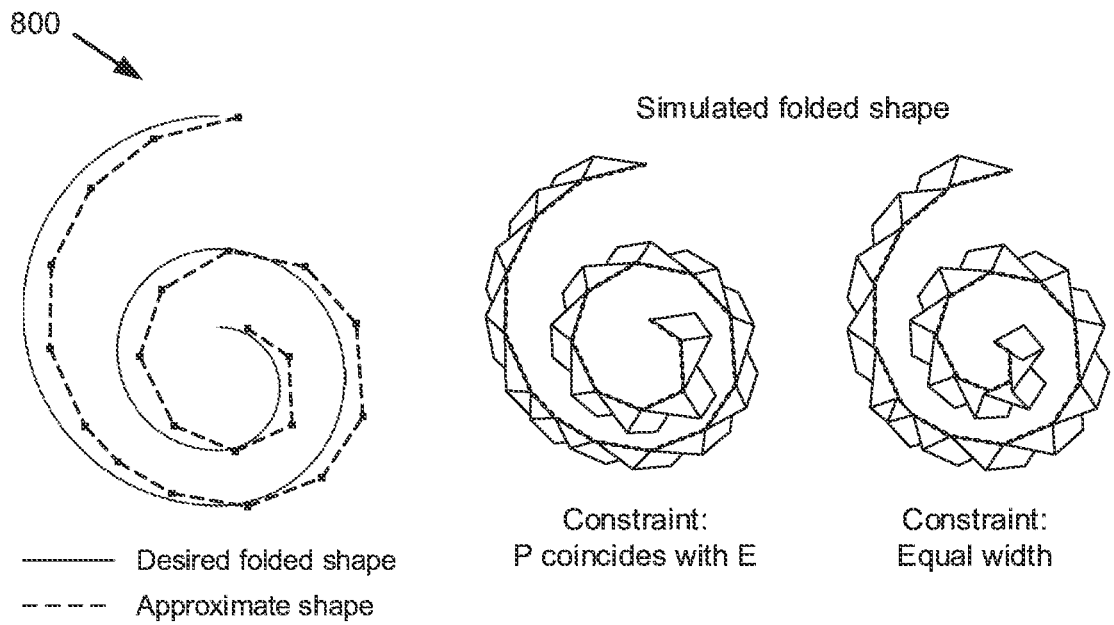

In an implementation, flat crease patterns of desired folded shapes can be generated based on simple shape parameters or 2D shape graphics. The basic parameters [h, a, b, d, θ] of the crease pattern can first be calculated from different desired folded shapes, including three regular shapes as shown in FIG. 7 and a general custom shape as shown in FIG. 8. A universal shape folding model is then shown in FIG. 9 to present the flat crease pattern and origami morphing process based on the calculated parameters.

Case 1: Regular Polygon (n>4)

As shown by diagram 700 in FIG. 7, a regular polygon can be defined with the number of sides (n), the side length (L), and the side thickness (W), which can be constructed by one type of crease pattern, such as I-3 (FIG. 2). Each crease pattern I can include two adjacent facets. On the basis of the $i^{th}$ crease pattern I-3, the line segments $d_{2i-1}$ (i=1~n) construct the final folded shape of the origami, and the angle $α_i$ between the line $d_{2i-1}$ and $d_{2i+1}$ can change the shape, which is constrained by the three adjacent angles θ.

$$α_i = π - 2θ_{2i} + θ_{2i-1} + θ_{2i+1}. \quad (1)$$

A constraint that point P coincides with E is used to make the final folded shape regular, which requires that line segment $d_{2i}$ bisects the line PE vertically. L corresponds to the value of $d_{2i-1}$, n determines the angle $\alpha_i$, and the height h can be calculated as follows:

$$d_{2i-1} = L; \qquad (2)$$
$$\theta_{2i-1} = \theta_{2i+1};$$
$$\alpha_i = \frac{180(n-2)}{n};$$
$$h = L\sin\theta_{2i-1} = 2W\cos\theta_{2i};$$

where the input shape parameters are [n, L, W], and the origami has n groups of crease patterns and 2n facets. In accordance with Equations (1) and (2), the parameters h and θ can be calculated. Next, the algorithm shown in Table 1 above can be used to calculate other size parameters [a, b, d] based on geometrical constraints.

Case 2: Rectangle (n=4)

As shown by diagram 702 in FIG. 7, for a rectangle (n=4), the desired shape can be defined with the side length L and the side width W. The shape can be constructed by four type of crease patterns of I-2, III, inverse I-2, and inverse II. The shape has four intersection angles of 90°, and L and W can consist of odd numbers of facets for closing the shape. Under satisfying the constraint that P coincides with E, $\theta_i$ can be 45° or 135° to ensure that the rectangle has the same thickness of T in the length and width direction. $\theta_i$ has the same values when using the crease pattern I-2 or inverse I-2. T is a passive parameter and equal to W cos 45° in this case. Assuming that the rectangle has 2m+1 and 2k+1 facets in the length and width direction, respectively, L and W restrict the value of positive integers m and k due to the same h, which can be expressed as follows:

$$\frac{h}{\sin\theta_i} = \frac{L}{m+1} = \frac{W}{k+1}, \qquad (3)$$

where m usually has many solutions, and the minimum value is taken by default to obtain the maximum h for easy fabrication. The parameter θ can be defined as follows:

$$\theta=[\theta_L,\theta_W,\theta_L,\theta_W,45°];\theta_L=45°\cdot I_{2m+1};\theta_W=135°\cdot I_{2k+1}, \qquad (4)$$

where $I_i$ is a unit matrix of 1×i. Here, the algorithm shown in Table 1 above is still used to calculate other size parameters [a; b; d], where the invalid situation that P cannot coincide with E is considered when the facets experience crease patterns except I. An additional constraint that adjacent facets must have no interference after complete folding can also be added.

Case 3: Regular Triangle (n=3)

As shown in diagram 704 of FIG. 7, a regular triangle (n=3) can be defined with the side length L and side thickness W. In the triangle, each interior angle is 60°, and each side has the same L and number of facets. The shape can be also constructed by four types of crease patterns of I-2, III, inverse I-2, and inverse II. Under satisfying the condition that P coincides with E, $\theta_i$ can be 60° or 120° to ensure the same W on each side. Each side can include odd numbers of facets (2q+1) for forming a closing shape, where q is a positive integer. L and W restrict the value of h and q, which can be expressed as follows:

$$h = 2W\cos\theta_i = L\frac{\sin\theta_i}{q+1}, \qquad (5)$$

where (L tan $\theta_i$/2W) is a positive integer to ensure that q is meaningful. The values of $\alpha_{2q+1}$, $\alpha_{2(2q+1)}$, and $\alpha_{3(2q+1)}$ at the three corners can be increased to prevent interference during folding, which is considered in the algorithm shown in Table 1 above. The actual perimeter of the triangle can be equal to 3L(q+2)/(q+1). For ease of use, q can be used rather than L to control the desired shape. Therefore, the shape parameters of this case are [n, q, W], and the actual L can be calculated by 1.15W(q+1). The size parameter θ is defined as follows.

$$\theta=[\theta_1\theta_2,\theta_1,120°];\theta_1=60°\cdot I_{2q+1};\theta_2=120°\cdot I_{2q+1}, \qquad (6)$$

where $I_{2q+1}$ is a unit matrix of 1×(2q+1). Other size parameters a, b, and d can be further produced by the algorithm shown in Table 1 above.

Case 4: Custom Shape

The above three cases illustrate how to obtain the basic parameters of regular shapes based on [n, L, W]. However, for an irregular shape, such as that shown by diagram 800 in FIG. 8, the shape parameters can be difficult to be given directly. Therefore, the shape parameters of the irregular shapes for calculation can be abstracted as follows. As shown in diagram 800, a series of linear segments, e.g., line segments $L_s$, can be used to fit the desired folded shape. Additionally, the angular differentials Δ between adjacent line segments can be determined, where Δ∈ [0, 360°]. A larger number of line segments can make the approximate shape closer to the desired shape. The value of $L_s$ corresponds to the value of $d_{2i-1}$; therefore, the angle $\theta_{2i-1}$ can be obtained once h is given. $\theta_{2i}$ can be first calculated by the angle Δ and Equation (1) as given above under the crease pattern I, where Δ is equal to a. However, the crease pattern I has limited performance on constructing the shape with a small intersection angle. The algorithm shown in Table 2 above can be used to combine multiple configurations of crease patterns for better shape construction, where thresholds defined by tuning parameters $\beta_1$ and $\beta_2$ are used. When Δ<$\beta_2$ or Δ>$\beta_1$, the pattern I can be replaced with the crease patterns II or III, and the corresponding θ will be updated. The algorithm shown in Table 1 above can then be employed after obtaining the angle θ to produce other size parameters a, b, and d.

The algorithm shown in Table 1 above can be configured to preferentially satisfy the constraint that P coincides with E and h=2W cos $\theta_{2i}$, precisely constructing the desired shapes. Therefore, the generated origami with the irregular folded shape may have a variable width, especially at small Δ, as shown in diagram 800. This condition can be due to the origami pattern having the same h but variable θ. If equal width is preferentially considered, the generated origami can exhibit discontinuous or superimposed lines $L_s$, as further shown in diagram 800, which may not follow the desired shape well. When the folded shape is divided by dense and uniform lines $L_s$, the width difference can be minimized under the constraint that P coincides with E.

Origami Shape Folding Model

Figure 9:
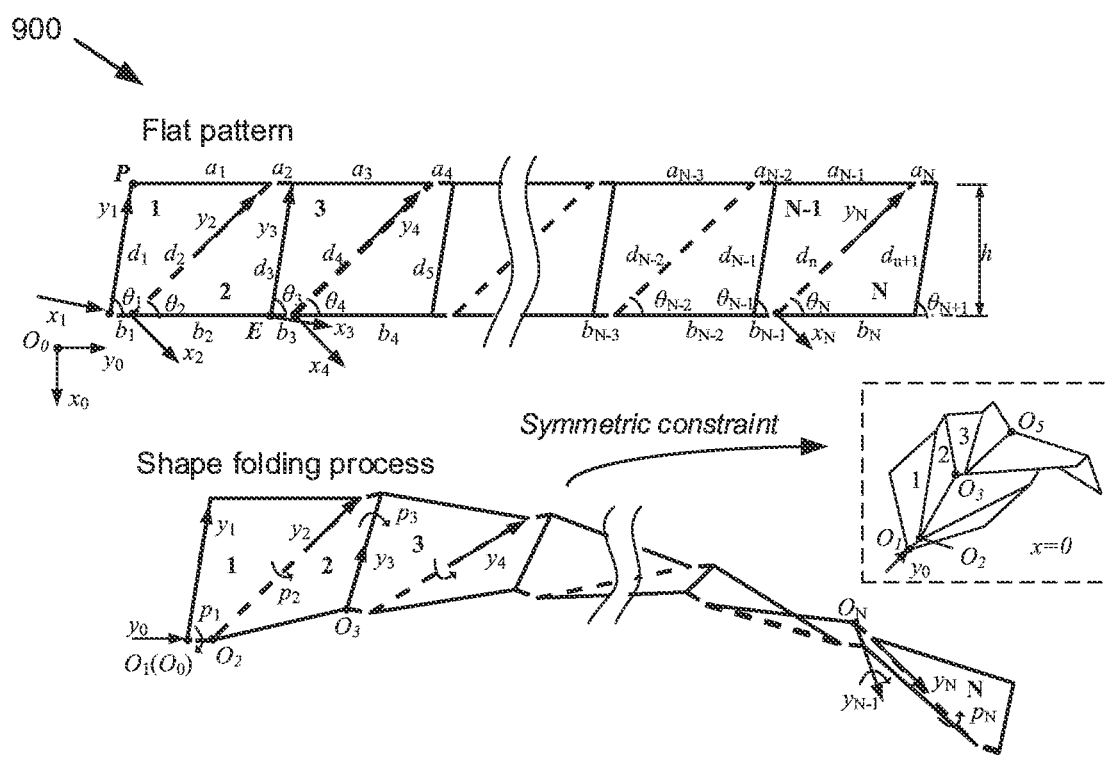

An example shape folding process for a general origami with basic parameters [h, a, b, d, θ] is modeled in diagram 900 in FIG. 9. Only half of one layer is used to describe the folding relationship due to the symmetry of the origami pattern. As shown in diagram 900, the flat pattern can be composited of N adjacent rigid facets with the same height h. The facet i has six additional parameters ($a_i$, $b_i$, $d_i$, $d_{i+1}$, $\theta_i$, $\theta_{i+1}$) to define its shape, where i=1~N. The line segment $d_i$ can be given as follows:

$$d_i = \frac{h}{\sin(\theta_i)}. \tag{7}$$

Two adjacent facets rotate around the intersection line ($d_i$) during the shape folding. For example, facet 2 can rotate an angle $p_2$ clockwise around the line $d_2$ relative to facet 1, whereas facet 3 can rotates an angle $p_3$ counter-clockwise around the line $d_3$ relative to facet 2. The lines $b_i$ can be coplanar due to the symmetric origami pattern when the facets are considered rigid. Therefore, facet 1 can rotate an angle $p_1$ counter-clockwise around line $b_1$ to meet the coplanar constraint. In accordance with space geometry calculation, the coplanar constraint can be represented as follows:

$$\tan p_1 \cdot \sin p_i = \cos \theta_i \cdot (1-\cos p_i), \tag{8}$$

where i>1, and the value of angle $p_i$ can be calculated by the angles $\theta_i$ and $p_1$. $p_1$ has a range of [0°, 90°] and determines the shape folding degree. The pattern is flat when $p_1$=0° and folded completely when $p_1$=90°. $p_i$=180° or −180° when $p_1$=90°, which is based on $\theta_i$. $p_i$ is negative with a range of [−180°, 0°] and positive with a range of [0°, 180°] when $\theta_i$>90° and $\theta_i$<90°, respectively.

A sub-coordinate system $O_i$ ($x_i$, $y_i$, $z_i$) can then be established on each facet i, where the origin $O_i$ is located at the intersection of lines $d_i$ and $b_i$, and the axis $y_i$ coincides with line $d_i$ and points from bottom to top. A base coordinate system $O_0$ ($x_0$, $y_0$, $z_0$) can be established to illustrate the folding motion, where the origin $O_0$ coincides with $O_1$, and axis $y_0$ coincides with line $b_1$ and points from left to right. When the rotation direction of $p_1$ is defined to be positive, the other rotation angles $P_i$ can be made in accordance with the right-hand rule and the calculated results of Equation (8).

$$\text{Rotation angle } P_i = -\frac{P_{i-1} \cdot p_{i-1}}{|P_{i-1} \cdot p_{i-1}|} p_i, \tag{9}$$

where i>1 and $P_1$=$p_1$. $p_i$ may be positive or negative in accordance with Equation (8). This equation is universal for all types of crease patterns and determines the mountain or valley folds.

In the shape folding motion, facet i can be considered rigid; therefore, the relative positions of the four vertexes of the facet can be unchangeable. The homogeneous position matrix of the facet i can be given in coordinate system $O_i$.

$$\text{facet}_i^i = \begin{bmatrix} x \\ y \\ z \\ 1 \end{bmatrix} = \begin{bmatrix} 0 & 0 & a_i \cdot \sin(\theta_i) & b_i \cdot \sin(\theta_i) \\ 0 & d_i & a_i \cdot \cos(\theta_i)+d_i & b_i \cdot \cos(\theta_i) \\ 0 & 0 & 0 & 0 \\ 1 & 1 & 1 & 1 \end{bmatrix}. \tag{10}$$

The basic functions of the 3D rotation matrix used are defined as follows:

$$R_y(x) = \begin{bmatrix} \cos x & 0 & \sin x & 0 \\ 0 & 1 & 0 & 0 \\ -\sin x & 0 & \cos x & 0 \\ 0 & 0 & 0 & 1 \end{bmatrix}, \tag{11}$$

$$R_z(x) = \begin{bmatrix} \cos x & -\sin x & 0 & 0 \\ \sin x & \cos x & 0 & 0 \\ 0 & 0 & 1 & 0 \\ 0 & 0 & 0 & 1 \end{bmatrix},$$

$$T_y(x) = \begin{bmatrix} 1 & 0 & 0 & 0 \\ 0 & 1 & 0 & x \\ 0 & 0 & 1 & 0 \\ 0 & 0 & 0 & 1 \end{bmatrix},$$

where $R_y(x)$ represents a rotation of x degrees around the y axis, $R_z(x)$ represents a rotation of x degrees around the z axis, and $T_y(x)$ represents a translation of x along the y axis.

The origin $O_{0\text{-}N}$ is always in the plane of x=0 due to the existence of the coplanar constraint. Facet 1 has a rotation of $P_1$ around the $y_0$ axis, and the coordinate system $O_1$ has a definite relationship with $O_0$ ($O^1_0 = R_y(P_1) \cdot R_z(\theta_1)$). The other coordinate systems $O_i$ ($x_i$, $y_i$, $z_i$) are further inferred relative to the coordinate system $O_0$, as follows:

$$O_0^i = O_0^{i-1} \cdot R_z(-\theta_{i-1}) \cdot T_y(b_{i-1}) \cdot R_z(\theta_i) \cdot R_y(P_i) \tag{12}$$

Therefore, the position of each facet in the base coordinate system can be calculated by using Equations (10) and (12).

$$\text{facet}_0^i = O_0^i \cdot \text{facet}_i^i. \tag{13}$$

The origami shape can be displayed by drawing all the facets in the base coordinate system. The folded motion of the origami can be simulated by changing the value of $p_1$. The solved vertex coordinates of these facets can be used to produce the crease pattern of the origami with different line styles. Mountain and valley folds are periodic in lines a and b, whereas the fold styles depend on the rotation direction of p around lines d. Given the coplanar constraint, this model can also process the origami patterns with any number of layers by adding some simple commands With reference now to FIG. 10, origami examples generated by the inverse origami design model described above are illustrated. As shown by FIG. 10, three regular shapes, i.e., a decagon 1000, rectangle 1002, and triangle 1004, are generated via the shape parameters of [10, 6, 2.5], [4, 20, 10], and [3, 5, 2.5], respectively. The stretched height of the origami can be adjusted by setting the value of layers in the model, e.g., as described above with respect to FIG. 6. Two multi-curvature shapes 1010, 1020 and their respective corresponding origami 1012, 1022 can be constructed on the basis of provided graphic files of the desired folded shapes. As further shown by 1030 and 1032, the model can also generate origami with complex geometries, such as the letter T, showing its good adaptability.

Design and Construction Platform for Soft Origami Robots

Figure 11:
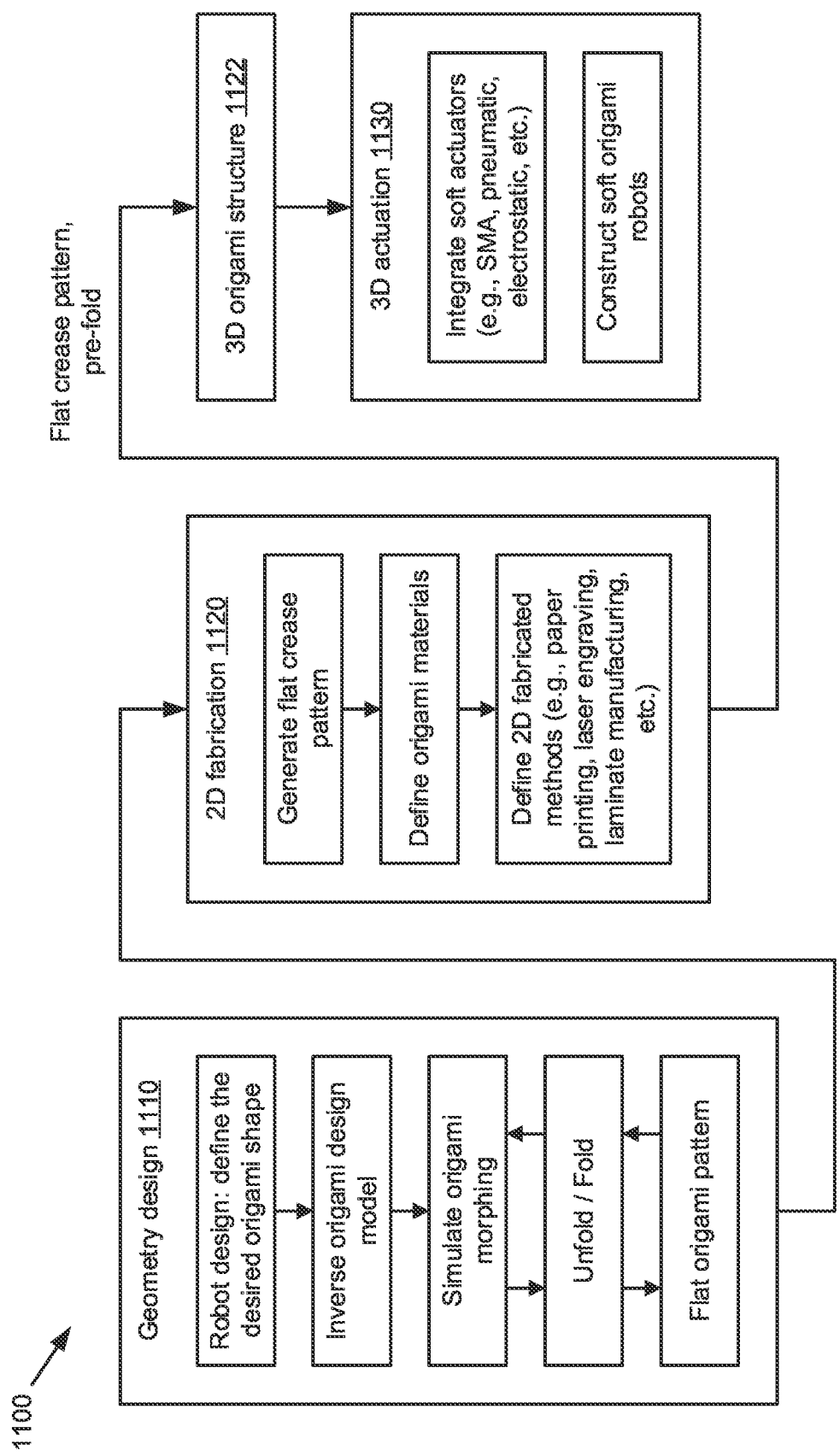
FIG. 11 is a diagram depicting example functions of a soft origami robot construction platform in accordance with various implementations described herein.

Turning now to FIG. 11, diagram 1100 illustrates an example integrated platform that can guide the design and construction of soft origami robots. As shown in diagram 1100, the platform can include three parts, namely geometry design 1110, 2D fabrication 1120, and 3D actuation 1130.

In the geometry design 1110, a desired origami shape can be defined in accordance with corresponding robot design parameters. The associated origami morphing can be simulated in the proposed inverse design model, and the corresponding flat crease pattern can be obtained.

In the 2D fabrication 1120, the sheet material, such as paper, PET films, etc., is chosen for producing a flat crease pattern. A matched 2D fabricated method (e.g., paper printing, laser engraving, laminate manufacturing, etc.) can then be used to write the crease pattern on the sheet. In an implementation, choice of the fabrication method can depend on the material(s) of the sheet and the desired folding stiffness. For instance, paper printing is usually used on soft and thin sheets, such as common A4 papers, to produce low-stiffness origami. Laser engraving can be used on stiffer sheets, such as PET, to produce origami with different folding stiffness by adjusting the laser power. Laminate manufacturing is used to produce thick origami with a large stiffness difference between sheet facets and creases.

In some implementations, the crease pattern generated during the 2D fabrication 1120 can include openings, and/or other suitable indicators, at respective positions relative to the crease pattern. These openings and/or indicators can then be utilized to facilitate the placement of actuators and/or other items into the resulting 3D origami structure(s) 1122 during the 3D actuation 1130.

The 3D origami structure(s) 1122 with the desired folded shapes and sizes can made by using the above operations combined with pre-folding. In the 3D actuation 1130, the origami structure(s) 1122 can integrate with various soft actuators, such as shape memory alloy (SMA), pneumatic, and electrostatic actuators, to achieve 3D actuation based on robot functional specifications. With this platform, soft origami robots with different functions can be constructed easily.

Soft Crawling Origami Robots

Figure 12:
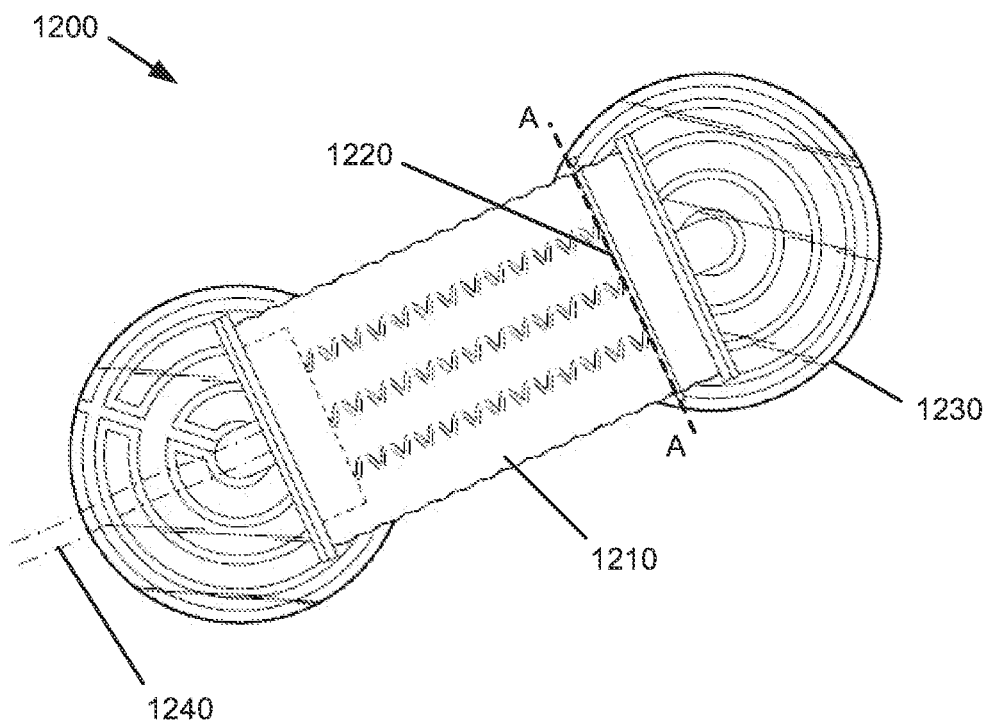
FIGS. 12-15 are diagrams depicting respective components of a soft origami robot that can be constructed in accordance with various implementations described herein.
Figure 13:
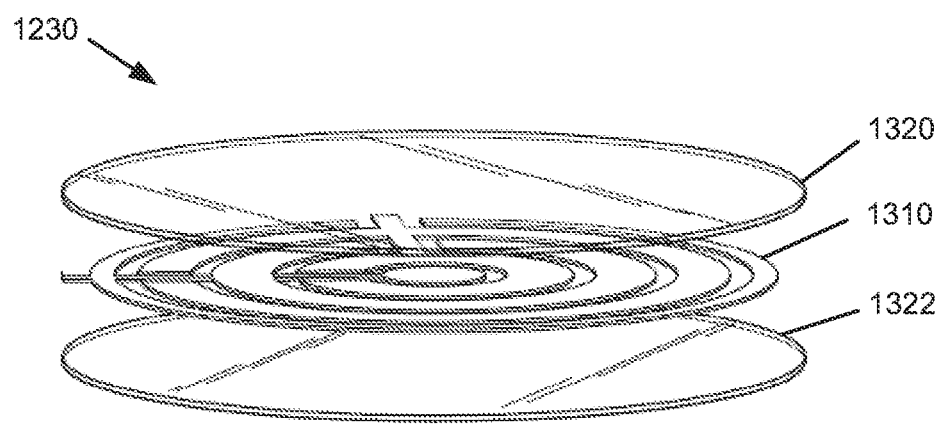
Figure 14:
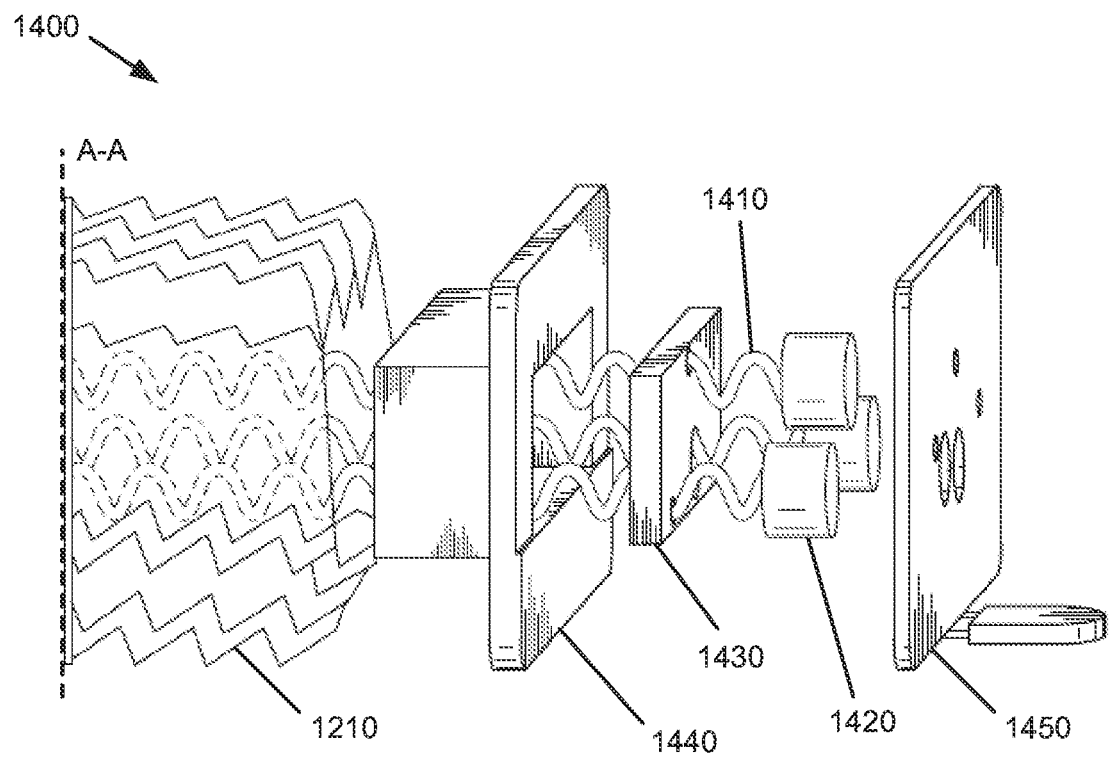

Turning to FIGS. 12-14, respective aspects of an example soft crawling robot using origami structures are illustrated. Referring first to FIG. 12, a robot body 1200, e.g., that can be designed with desired regular shapes and sizes based on the inverse origami design model described above, is illustrated. Following the design and construction platform described above with respect to FIG. 11, the used origami body 1210 can be made of PET films, e.g., by laser engraving and pre-folding, and three shape memory alloy (SMA) coil actuators 1220 can be inserted into the robot body 1200 to achieve 3D actuation. Two flexible electrostatic actuators 1230 can also be incorporated into the robot as electro-adhesive feet, which can made by sputter coating (e.g., as described in further detail below with respect to FIGS. 18-19) and provide reversible and robust electrostatic adhesion on large-range surfaces. As shown in FIG. 13, an example flexible electrostatic actuator 1230 can be composed of an electrode 1310 positioned between two layers 1320, 1322 of polyimide film.

Returning to FIG. 12, a soft air tube 1240 can be introduced into the origami body 1210 for accelerating airiness. In accordance with the exploded view 1400 of A-A as shown by FIG. 14, each SMA coil actuator 1410 can be compacted with a soft wire by using a hollow aluminum tube 1420 and attaching to the origami body 1210 after passing through a location plate 1430 and cap 1440. In a non-limiting implementation, the location plate 1430 can be composed of carbon fiber and have a thickness of approximately 0.2 mm, and the cap 1440 can be composed of polylactic acid (PLA) materials. As further shown by FIG. 14, the location plate 1430 can have three small holes for distributing three actuators radially.

Figure 15:
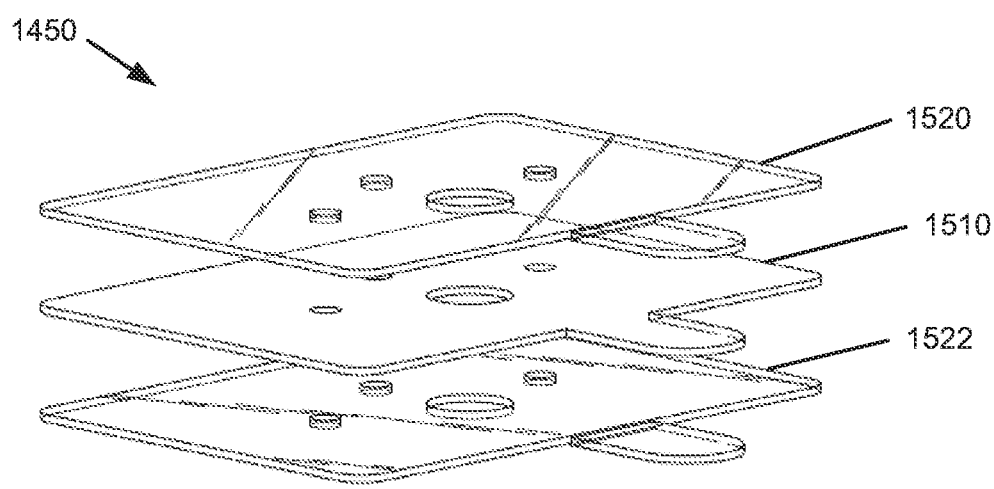

An origami hinge 1450, shown in further detail by FIG. 15, can be constructed by a multilayer composition that includes two PET films 1510, 1512 and one middle adhesive layer 1520. In a non-limiting implementation, the adhesive layer 1520 can have a thickness of approximately 0.2 mm. The hinge 1450 connects the body with the electro-adhesive feet while allowing a low relative rotational stiffness between them.

Figure 16:
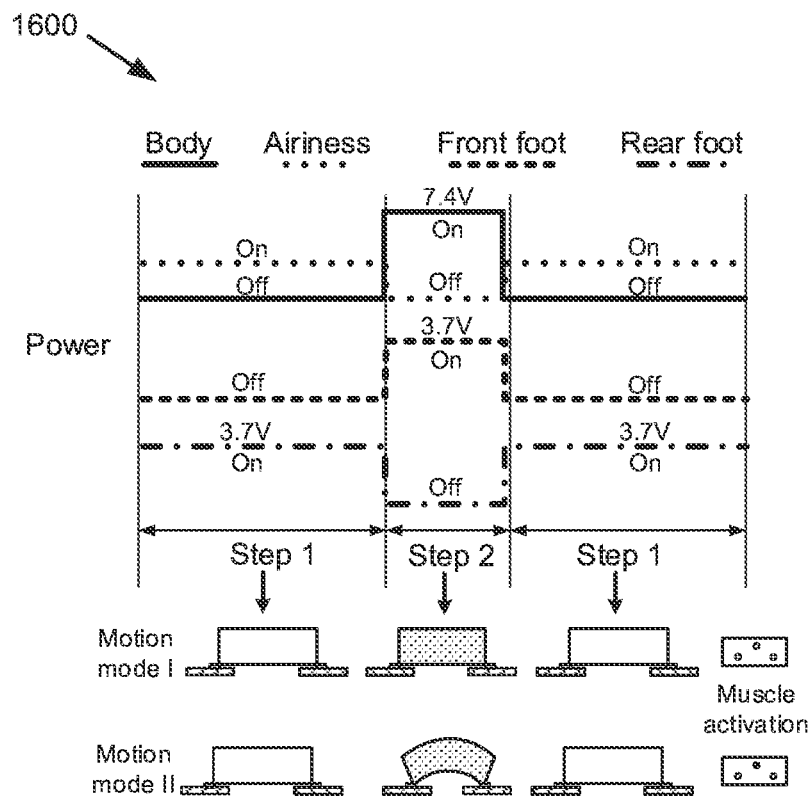
FIGS. 16-17 are diagrams depicting example movements of a soft origami robot in accordance with various implementations described herein.

The actuation schematic of the robot described above with respect to FIGS. 12-15 is shown by diagram 1600 in FIG. 16. As shown in diagram 1600, Two steps are performed in each cycle. The robot can achieve two forward-motion modes by activating different combinations of muscle actuators. Motion mode I requires three actuators to be activated simultaneously (as shown in diagram 1600 via unfilled circles), similar to an earthworm, to achieve peristalsis that can pass through a narrow height. In contrast, motion mode II only requires two muscle actuators to realize the extension and flexion movement, similar to an inchworm, moving at a relatively fast speed and low power consumption.

Figure 17:
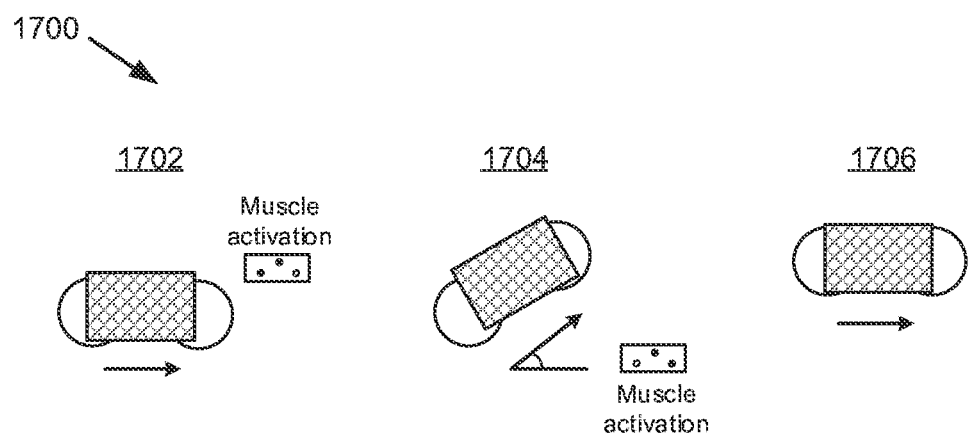

As further shown by diagram 1700 in FIG. 17, a soft origami robot can turn by activating one side of the SMA muscle described above. When the right side of the muscle is activated periodically, e.g., as shown by 1702, the robot can turn left at a substantially constant speed. When the left side of the muscle was activated periodically, e.g., as shown by 1704, the robot turned right with a similar speed, resulting in a return to its previous orientation, e.g., as shown by 1706.

Referring next to FIG. 18, a diagram 1800 depicting an example process for fabricating a flexible electrostatic actuator, e.g., an actuator 1230, is provided. As shown at 1802, a mask 1810 for sputter coating can be 3D-printed on the basis of a desired geometry and transferred on a polyimide film 1820 with adhesive 1830. Next, as shown at 1804, a sputter coater can be utilized to apply sputter coated copper 1840 from a copper target material 1850 onto the polyimide film 1820. As shown at 1806, the mask 1810 can be removed, and two soft wires can be attached to the two poles of the electrode. Finally, as shown at 1808, the electrode layer can be sandwiched by two polyimide films 1820 with adhesive 1830, and the sample can be cut at locations 1860 into the desired shape.

FIG. 19 is an overhead view of an example pattern that can be used for the electrode 1310 of the electrostatic actuator 1230 shown in FIG. 12. The produced electrostatic actuator 1230 is flexible and can deform under a light load, thereby adapting to different environments well. For instance, as additionally shown by diagram 2000 in FIG. 20, the flexible electrostatic actuator 1230 can deform under the action of electrostatic force, thereby adapting to flat, convex, and concave substrates.

Soft origami robots as described above can use an origami structure with SMA muscle actuators to achieve multimodal motions in a compact structure, including peristalsis, crawling, turning, and climbing. The soft origami robot can climb on flat and curved surfaces without any adjustment by integrating with a flexible electrostatic actuator, significantly expanding the environmental adaptability of current soft crawling robots. Its shape and size are easy to reconfigure and can be rapidly prototyped for new applications by using the inverse origami design model provided herein.

Vacuum-Actuated Origami Muscle (VAOM)

Figure 21:
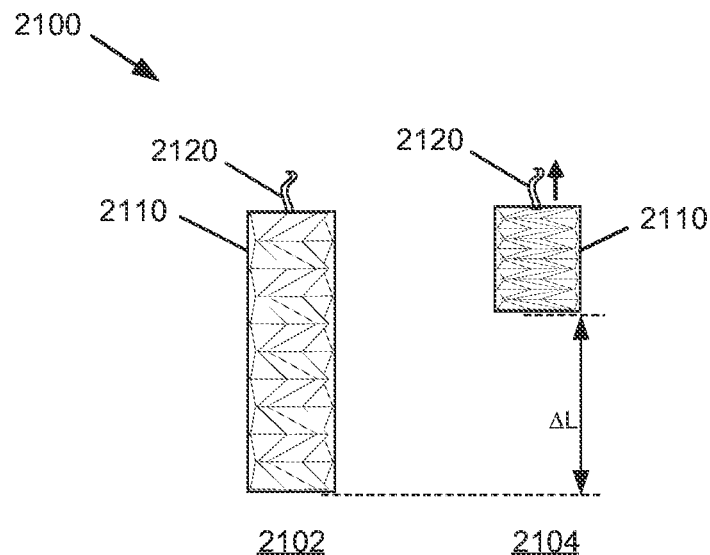
FIGS. 21-22 are diagrams depicting respective aspects of a vacuum-activated origami muscle in accordance with various implementations described herein.

Turning now to FIG. 21, diagram 2100 illustrates the use of origami structures to develop a soft VAOM that can achieve linear reciprocating actuation similar to human muscles. On the basis of the inverse origami design model, origami structures with desired regular shapes and sizes are made and then sealed up with a wrapping film 2110 to construct the VAOM, as shown in diagram 2100. An air tube 2120 is placed into the origami structure and facilitates formation of a vacuum that compresses the structure, as shown by the change in the structure from state 2102 to state 2104.

Figure 22:
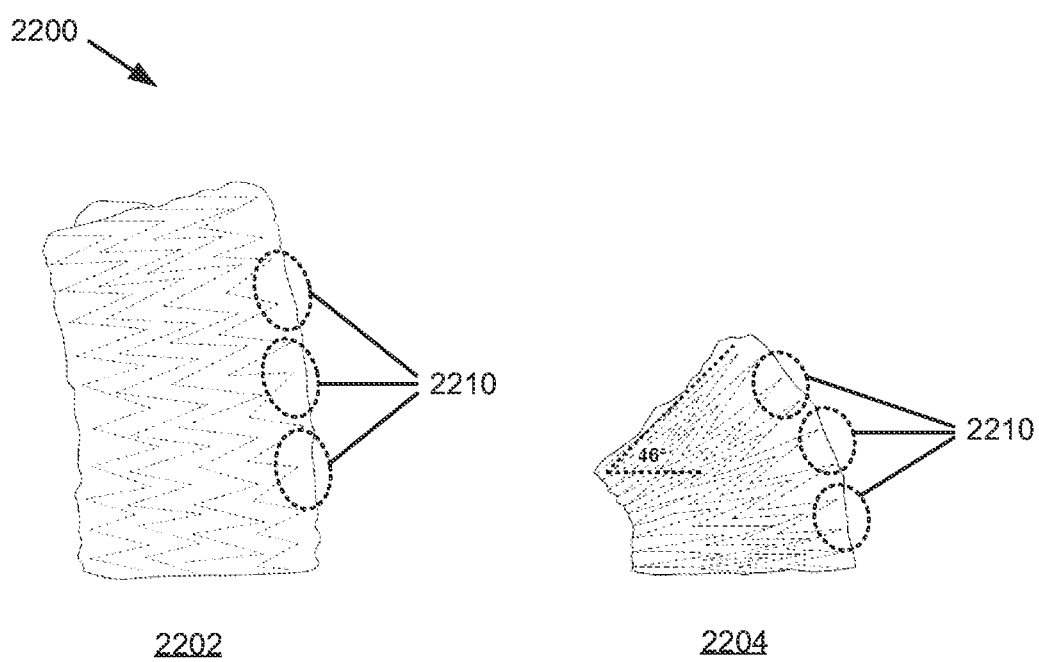

Diagram 2200 in FIG. 22 depicts a VAOM with improved stiffness by using a PET film to fabricate the origami structure. The VAOM works well under a lateral pressure, showing its unique properties, including axial compliance and radial stability. In a high-pressure environment, the VAOM still maintains its actuation capacity, which can greatly promote its application. Diagram 2200 further shows that when a defect 2210 is designed to occur in particular positions of a nonstandard origami, the original axial folding may transfer to a bend folding under the vacuum actuation, as shown by the change in the structure from state 2202 to state 2204. These reversible defects can be made by popping the valley fold into another mechanically stable state, and they provide a possibility of customizing the folding motion of the origami.

Figure 23:
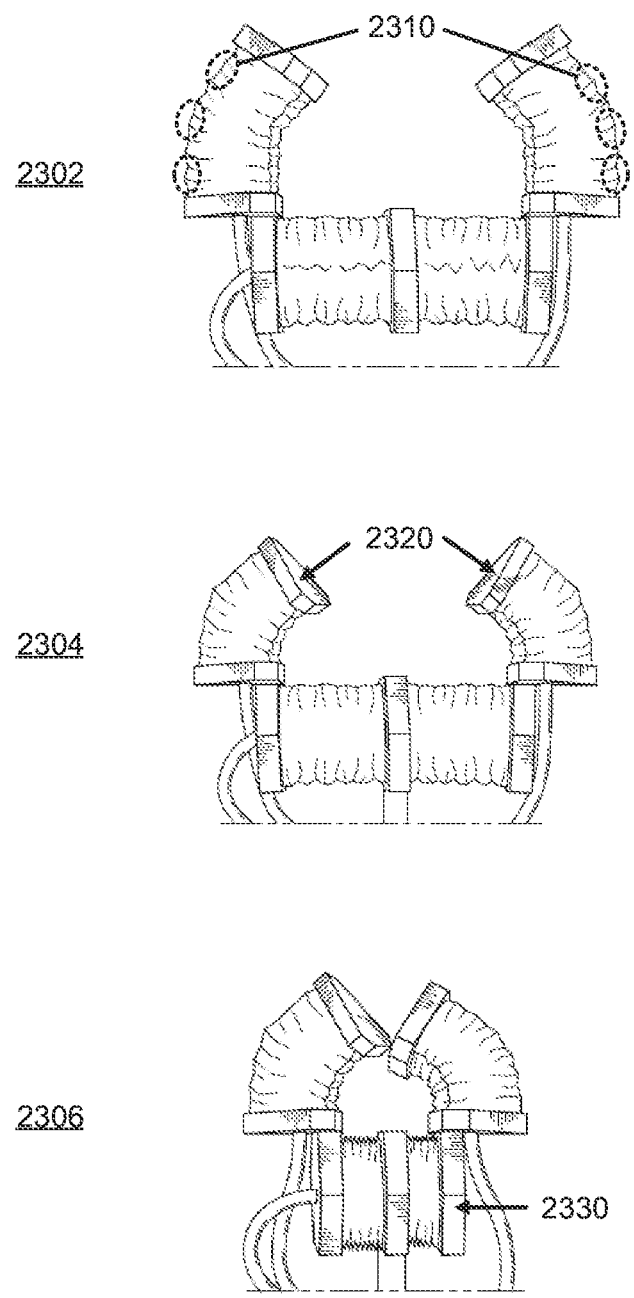
FIGS. 23-25 are diagrams depicting respective soft origami robots, and components thereof, that can be constructed in accordance with various implementations described herein.

FIG. 23 illustrates the use of defects 2310 to modify the folding motion of two VAOMs 2320 to construct a soft gripper. Diagram 2302 illustrates an initial state of the gripper, while diagram 2304 illustrates a state of the gripper subsequent to activation of the VAOMs 2320. As further shown by diagram 2306, the gripper can be closed under the combined actuation of the VAOMs 2320 and a middle VAOM 2330, thereby enabling the gripper to grasp objects of different sizes.

Compared with conventional vacuum-actuated muscles, the VAOM-based design described above has advantages in structure stability, programmable design, and no twisting motion involved. On the basis of the inverse design platform, the VAOM can be easily constructed with different materials, shapes, and sizes, thereby allowing the development of various VAOM-based robots for new applications.

Miniature Soft Origami Gripper

Figure 24:
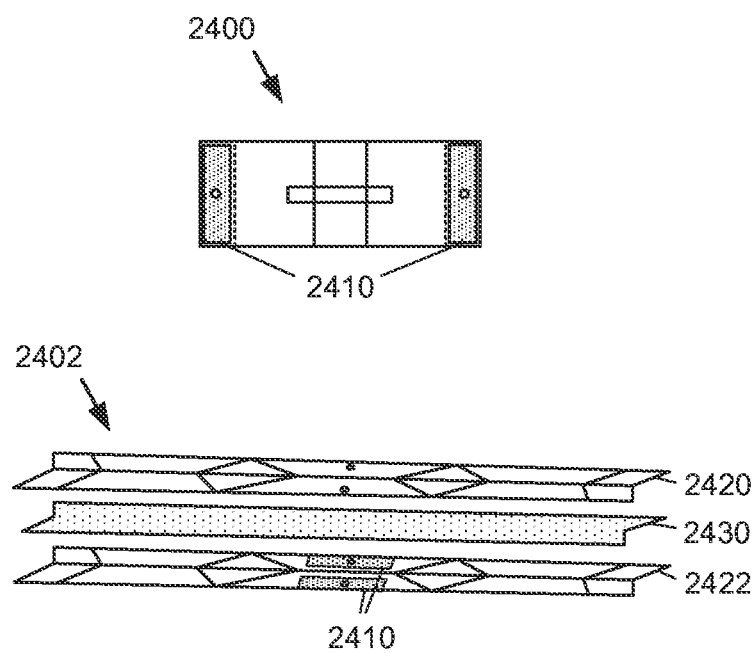
Figure 25:
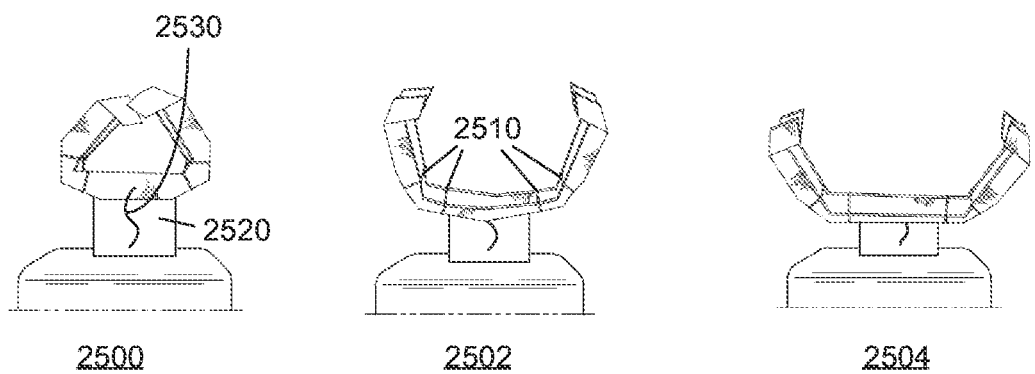

Referring next to FIGS. 24-25, the use of shaping origami folds in developing a miniature soft gripper for compliant grasping is illustrated. With reference to FIG. 24, patterns associated with an origami hinge 2400 and origami gripper 2402 are provided. The hinge 2400 and gripper 2402 are designed in accordance with the desired curved shapes using the proposed inverse origami design model. As shown by FIG. 24, the hinge 2400 and gripper 2402 include adhesion areas 2410 to facilitate adhesion of the hinge 2400 to the gripper 2402.

The origami structure of the gripper 2402 uses laminate manufacturing in 2D fabrication, which is a multilayer composition, including two PET films 2420, 2422 cut by the same crease pattern and one double-side polyimide adhesive 2430. The origami shape of the gripper 2402 can be changed by rotating any of its facets because of movement transmission.

FIG. 25 illustrates an example opening operation of the origami structures shown in FIG. 24 over three states 2500, 2502, 2504. As shown at stage 2504, four rubber bands 2510 are attached to the origami structure to enable the gripper to keep its initial closed state. An origami hinge 2520 is designed to provide compliant support for the gripper and to connect with other places easily. An SMA coil actuator 2530 is then used to open the gripper for grasping. When the SMA coil 2530 is de-energized, the gripper trends to the initial closed state under the restoring force of the rubber bands 2510, thereby grasping objects without consuming power.

In an implementation, an origami gripper as shown by FIG. 25 can be assembled to a soft crawling robot, e.g., as described above with respect to FIGS. 12-17, to endow the crawling robot with manipulative capabilities. For instance, short-time activation of the SMA coil can open the gripper and let an object enter a capture range when the robot approaches an object. The gripper closes and grasps the object without power consumption after the SMA coil is de-energized. The robot can then continue to push forward or drag the object backward. When the robot arrives at a suitable position, the object can be released by activating the SMA coil again.

Compared to conventional soft grippers that are mostly fabricated by complicated steps and careful assembly, manufacturing of the origami gripper is simple and easy of scale. The origami gripper is also easy for storage and transportation due to unique advantages of ultralight weight and reversible morphing between flat and 3D forms, and can grasp objects by simple folding. The bi-stability exhibited by the origami structure can reduce the requirement for external continuous actuation. With the aid of the inverse design model, the shape and size of the gripper are easily reconfigured for applications at different scales.

Inverse Origami Design Platform

Figure 26:
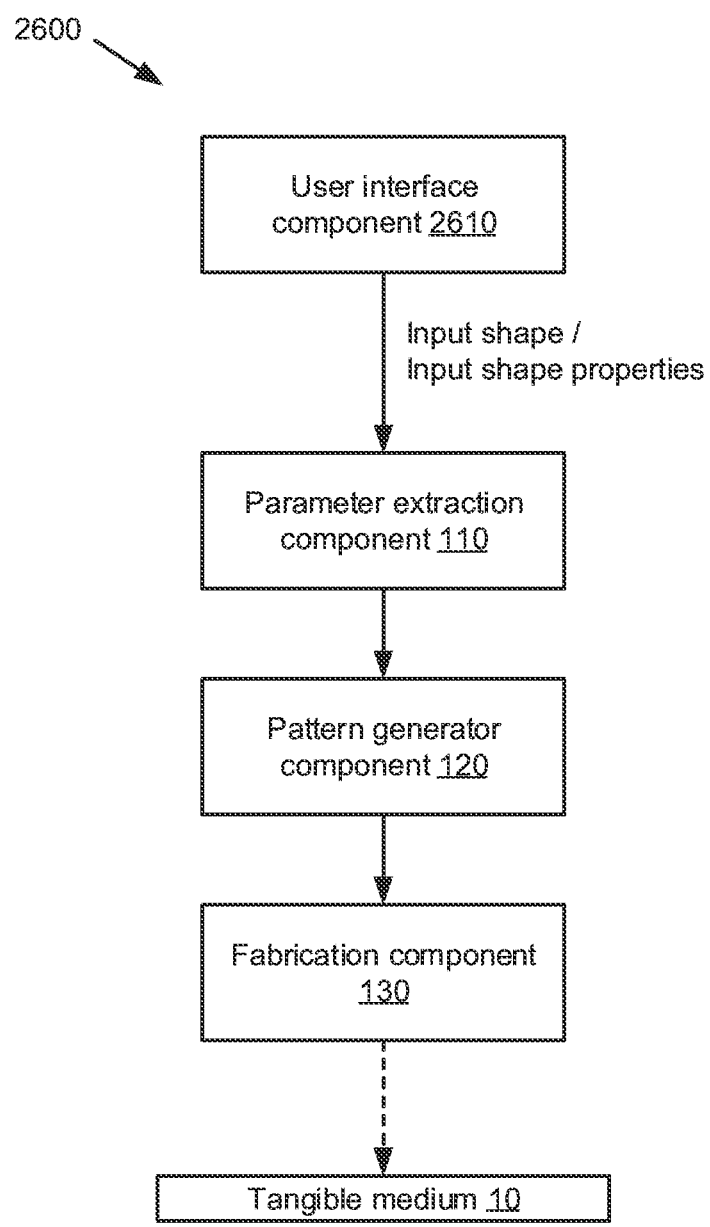
FIG. 26 is a block diagram of a system that facilitates inverse origami design via parameters provided via a user interface in accordance with various implementations described herein.

Turning now to FIG. 26, a block diagram of a system 2600 that facilitates inverse origami design via parameters provided via a user interface is illustrated. As shown in FIG. 26, system 2600 includes a parameter extraction component 110, a pattern generator component 120, and a fabrication component 130 that can operate as described above with respect to FIG. 1. Additionally, system 2600 includes a user interface component 2610 that can enable a user to provide an input shape and/or shape properties to the parameter extraction component 110, e.g., via a graphical user interface (GUI).

Figure 27:
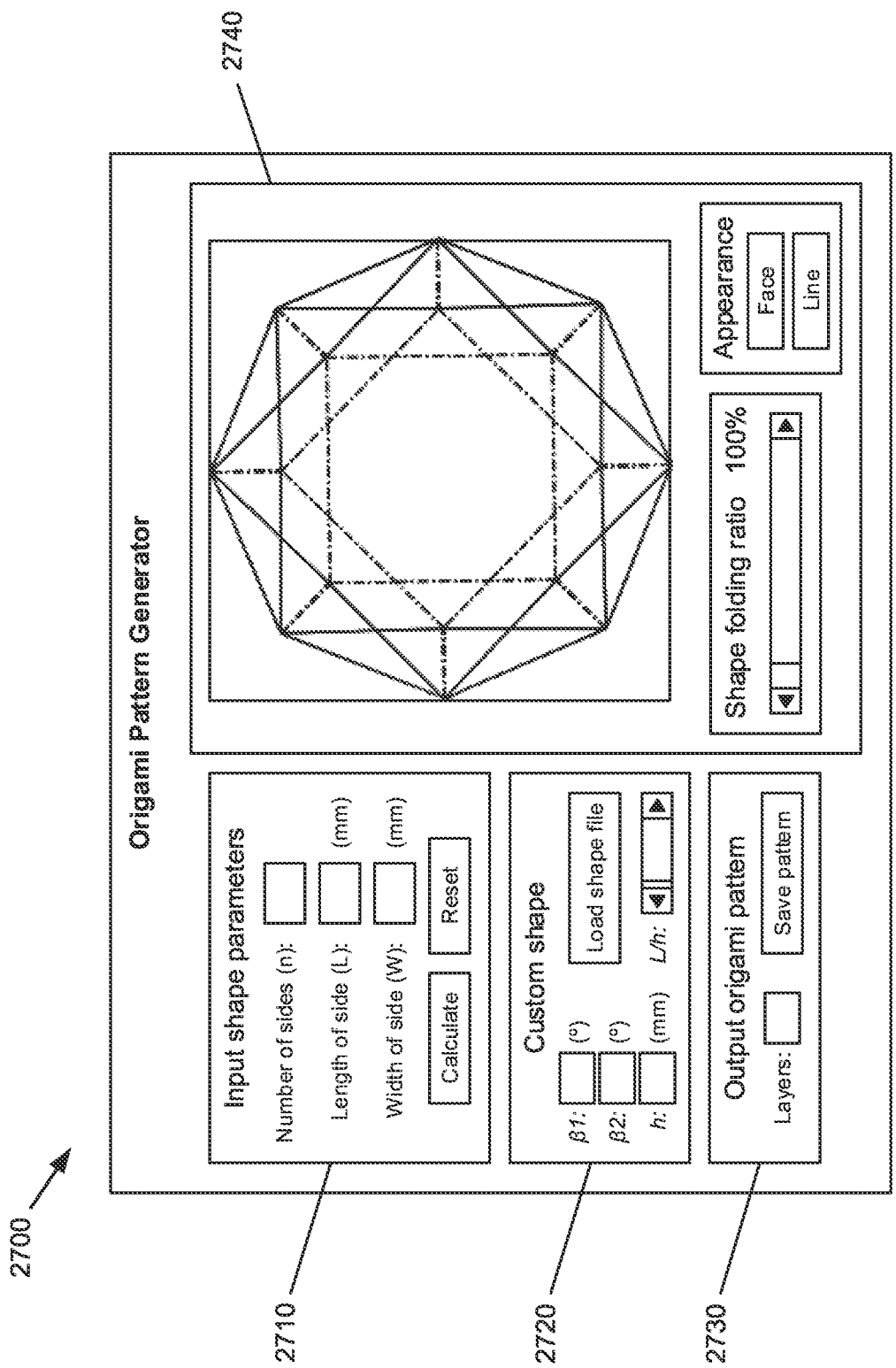
FIG. 27 is a diagram depicting an example user interface that can be utilized by the system shown in FIG. 26.

FIG. 27 depicts a non-limiting example of a GUI 2700 that can be utilized by the user interface component 2610 of system 2600. As shown in FIG. 27, the GUI 2700 includes four display areas 2710, 2720, 2730, 2740. Display area 2710 facilitates the entry of shape parameters [n, L, W], e.g., for a desired origami corresponding to a regular shape as described above. For an irregular shape, a user can provide a graphic file with the desired shape, e.g., consisting of a continuous line, and load the file into the GUI 2700 via the button in display area 2720. In response to loading a shape file in display area 2720, the GUI 2700 can display the loaded graphic and enable the user to divide the graphic with any density of line segments. After setting the number of layers in display area 2730, users can save the corresponding flat pattern as a file for subsequent fabrication.

In response to generation of a pattern, the calculated origami shape can be displayed in display area 2740. Users can adjust this origami shape, e.g., by changing the value of h and thresholds of $\beta_1$ and $\beta_2$ in display area 2720. The value of L/h can ensure size matching between the calculated and desired origami. As additionally shown in visual area 2720, users can check the morphing of the desired origami by changing the shape folding ratio to observe corresponding changes to the crease patterns.

Two-Dimensional Fabrication

As described above with respect to FIG. 27, the flat crease pattern of a desired origami structure is saved as an independent file in the inverse origami design platform. A non-exhaustive listing of fabrication methods that can be used to write the pattern on a flat sheet are provided below.

Paper printing: In this method, the flat crease pattern can be printed directly on paper (e.g., an A4 paper sheet) and then cut from the paper. The paper can be folded manually, and the pattern can guide paper folding to produce the desired origami shape. For a regular folded shape, the two ends of the origami can be connected by a double-sided adhesive. The method is accessible and low-cost, and the generated origami has low folding stiffness.

Laser writing: In this method, a PET film with a thickness of approximately 0.2 mm can be used for laser writing of the flat crease patterns, due to the mechanical properties and heat resistance of PET film. When hard materials are used to fabricate the origami pattern, stress concentration can be considered at the intersection of creases during folding. Accordingly, adding hole patterns into the flat origami pattern can effectively eliminate stress concentration. For a regular folded shape, locking patterns can be added into the flat crease pattern to connect the two ends of the origami with solid mechanical interlocking. A laser cutting device can be used to engrave the mountain and valley creases on the front and back of a PET film. The cut creases (edge, hole, and locking patterns) can be completely cut off from the PET film. From the resulting flat origami pattern, the desired origami structure can be formed after pre-folding. The generated origami stiffness can be adjusted by changing the film thickness or laser engraving power.

Laminate manufacturing: In this method, two PET films with a thickness of approximately 0.2 mm can be laser cut in accordance with the same flat crease pattern. Several openings (holes, apertures, etc.) can be added to the flat crease pattern for installing SMA actuators. A polyimide double-sided adhesive can be used as the middle layer to bond the two PET films together, thereby forming a sandwiched structure. The desired origami shape can be obtained by folding the flat sheet. This method can enlarge the stiffness difference between facets and creases, thereby allowing the generated origami to have a good transferability of motion among facets.

Flexible Electrostatic Actuator

An electrostatic actuator can be used to provide reversible and robust adhesion. As described above with respect to FIG. 13, it can be composed of a concentric circular copper electrode 1310 sandwiched between two polyimide films 1320, 1322 with adhesive. The electrode generates an electric field under high voltage, changes the charge distribution on the working surface by electrostatic induction, and then utilizes Coulomb force to generate electrostatic adhesion. The concentric circular electrode can generate stronger electrostatic adhesion than other electrode geometries. Returning to FIG. 18, the copper electrode can be sputter-coated on the bottom polyimide film to minimize its thickness, e.g., to approximately 270 nm. The bottom polyimide film can act as a dielectric layer to separate the electrode from working surfaces. The top polyimide film can cover and fill the gaps among the interdigitate electrodes together with the bottom film. The flexible electrostatic pad, with a thickness of approximately 35 μm, has low deformation resistance so that it can adapt to the working surfaces with moderate curvatures under the action of Coulomb force, as described above with respect to FIG. 20.

Figure 28:
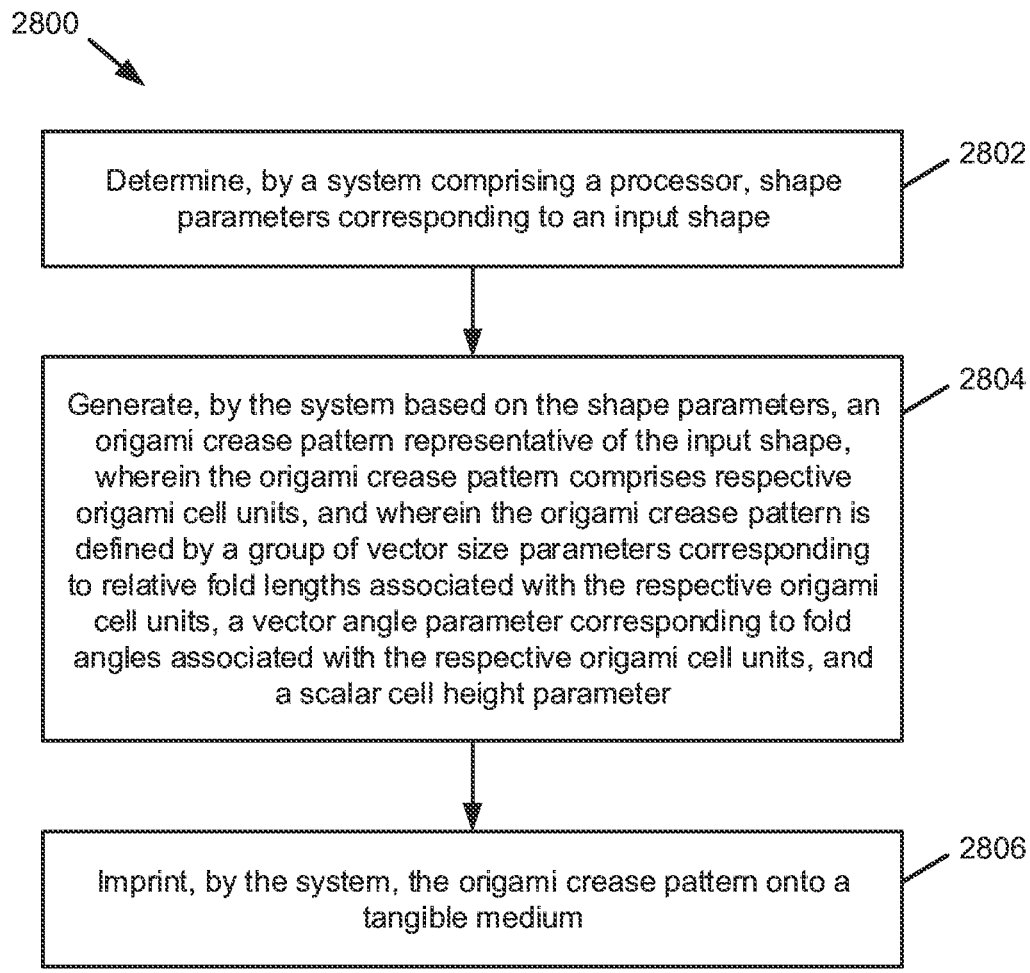
FIG. 28 is a flow diagram of a method that facilitates inverse origami design for soft robotic development in accordance with various implementations described herein.

Referring next to FIG. 28, a flow diagram of a method 2800 that facilitates inverse origami design for soft robotic development is illustrated. At 2802, a system comprising a processor can determine (e.g., by a parameter extraction component 110) shape parameters corresponding to an input shape.

At 2804, the system can generate (e.g., by a pattern generator component 120) an origami crease pattern representative of the input shape. The origami crease pattern can comprise respective origami cell units (e.g., origami cells 230), and can be defined by a group of vector size parameters corresponding to relative fold lengths associated with the respective origami cell units, a vector angle parameter corresponding to fold angles associated with the respective origami cell units, and a scalar cell height parameter.

At 2806, the system can imprint (e.g., by a fabrication component 130) the origami crease pattern onto a tangible medium (e.g., a paper sheet, one or more PET sheets, etc.).

FIG. 28 as described above illustrates a method in accordance with certain embodiments of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 29:
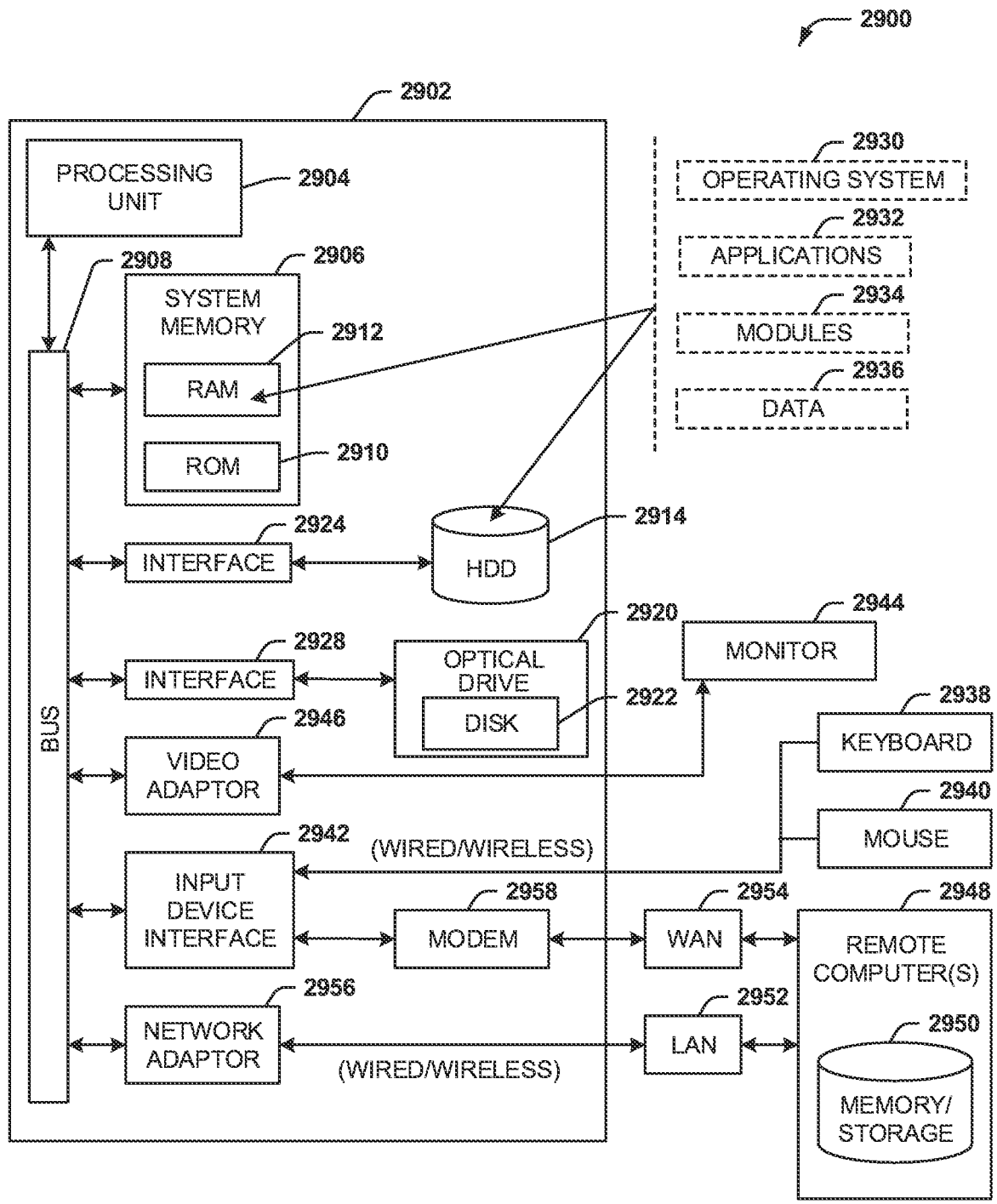
FIG. 29 is a diagram of an example computing environment in which various embodiments described herein can function.

In order to provide additional context for various embodiments described herein, FIG. 29 and the following discussion are intended to provide a brief, general description of a suitable computing environment 2900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 29, the example environment 2900 for implementing various embodiments described herein includes a computer 2902, the computer 2902 including a processing unit 2904, a system memory 2906 and a system bus 2908. The system bus 2908 couples system components including, but not limited to, the system memory 2906 to the processing unit 2904. The processing unit 2904 can be any of various commercially available processors. Dual microprocessors and other multi-processor architectures can also be employed as the processing unit 2904.

The system bus 2908 can be any of several types of bus structure that can further interconnect to a memory bus (with or without a memory controller), a peripheral bus, and a local bus using any of a variety of commercially available bus architectures. The system memory 2906 includes ROM 2910 and RAM 2912. A basic input/output system (BIOS) can be stored in a non-volatile memory such as ROM, erasable programmable read only memory (EPROM), EEPROM, which BIOS contains the basic routines that help to transfer information between elements within the computer 2902, such as during startup. The RAM 2912 can also include a high-speed RAM such as static RAM for caching data.

The computer 2902 further includes an internal hard disk drive (HDD) 2914 (e.g., EIDE, SATA), one or more external storage devices 2916 (e.g., a magnetic floppy disk drive (FDD), a memory stick or flash drive reader, a memory card reader, etc.) and an optical disk drive 2920 (e.g., which can read or write from a CD-ROM disc, a DVD, a BD, etc.). While the internal HDD 2914 is illustrated as located within the computer 2902, the internal HDD 2914 can also be configured for external use in a suitable chassis (not shown). Additionally, while not shown in environment 2900, a solid state drive (SSD) could be used in addition to, or in place of, an HDD 2914. The HDD 2914, external storage device(s) 2916 and optical disk drive 2920 can be connected to the system bus 2908 by an HDD interface 2924, an external storage interface 2926 and an optical drive interface 2928, respectively. The interface 2924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2912, including an operating system 2930, one or more application programs 2932, other program modules 2934 and program data 2936. All or portions of the operating system, applications, modules, and/or data can also be cached in the RAM 2912. The systems and methods described herein can be implemented utilizing various commercially available operating systems or combinations of operating systems.

Computer 2902 can optionally comprise emulation technologies. For example, a hypervisor (not shown) or other intermediary can emulate a hardware environment for operating system 2930, and the emulated hardware can optionally be different from the hardware illustrated in FIG. 29. In such an embodiment, operating system 2930 can comprise one virtual machine (VM) of multiple VMs hosted at computer 2902. Furthermore, operating system 2930 can provide runtime environments, such as the Java runtime environment or the .NET framework, for applications 2932. Runtime environments are consistent execution environments that allow applications 2932 to run on any operating system that includes the runtime environment. Similarly, operating system 2930 can support containers, and applications 2932 can be in the form of containers, which are lightweight, standalone, executable packages of software that include, e.g., code, runtime, system tools, system libraries and settings for an application.

Further, computer 2902 can be enable with a security module, such as a trusted processing module (TPM). For instance with a TPM, boot components hash next in time boot components, and wait for a match of results to secured values, before loading a next boot component. This process can take place at any layer in the code execution stack of computer 2902, e.g., applied at the application execution level or at the operating system (OS) kernel level, thereby enabling security at any level of code execution.

A user can enter commands and information into the computer 2902 through one or more wired/wireless input devices, e.g., a keyboard 2938 and/or a pointing device such as a mouse 2940. Other input devices (not shown) can include a touch screen, a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2904 through an input device interface 2944 that can be coupled to the system bus 2908, but can be connected by other interfaces, such as a parallel port, an IEEE 1394 serial port, a game port, a USB port, an IR interface, a BLUETOOTH® interface, etc.

A monitor 2946 or other type of display device can be also connected to the system bus 2908 via an interface, such as a video adapter 2948. In addition to the monitor 2946, a computer typically includes other peripheral output devices (not shown), such as speakers, printers, etc.

The computer 2902 can operate in a networked environment using logical connections via wired and/or wireless communications to one or more remote computers, such as a remote computer(s) 2950. The remote computer(s) 2950 can be a workstation, a server computer, a router, a personal computer, portable computer, microprocessor-based entertainment appliance, a peer device or other common network node, and typically includes many or all of the elements described relative to the computer 2902, although, for purposes of brevity, only a memory/storage device 2952 is illustrated. The logical connections depicted include wired/wireless connectivity to a local area network (LAN) 2954 and/or larger networks, e.g., a wide area network (WAN) 2956. Such LAN and WAN networking environments are commonplace in offices and companies, and facilitate enterprise-wide computer networks, such as intranets, all of which can connect to a global communications network, e.g., the Internet.

When used in a LAN networking environment, the computer 2902 can be connected to the local network 2954 through a wired and/or wireless communication network interface or adapter 2958. The adapter 2958 can facilitate wired or wireless communication to the LAN 2954, which can also include a wireless access point (AP) disposed thereon for communicating with the adapter 2958 in a wireless mode.

When used in a WAN networking environment, the computer 2902 can include a modem 2960 or can be connected to a communications server on the WAN 2956 via other means for establishing communications over the WAN 2956, such as by way of the Internet. The modem 2960, which can be internal or external and a wired or wireless device, can be connected to the system bus 2908 via the input device interface 2944. In a networked environment, program modules depicted relative to the computer 2902 or portions thereof, can be stored in the remote memory/storage device 2952. It will be appreciated that the network connections shown are example and other means of establishing a communications link between the computers can be used.

When used in either a LAN or WAN networking environment, the computer 2902 can access cloud storage systems or other network-based storage systems in addition to, or in place of, external storage devices 2916 as described above. Generally, a connection between the computer 2902 and a cloud storage system can be established over a LAN 2954 or WAN 2956 e.g., by the adapter 2958 or modem 2960, respectively. Upon connecting the computer 2902 to an associated cloud storage system, the external storage interface 2926 can, with the aid of the adapter 2958 and/or modem 2960, manage storage provided by the cloud storage system as it would other types of external storage. For instance, the external storage interface 2926 can be configured to provide access to cloud storage sources as if those sources were physically connected to the computer 2902.

The computer 2902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a system comprising a processor, shape parameters corresponding to an input shape;
   generating, by the system based on the shape parameters, an origami crease pattern representative of the input shape, wherein the origami crease pattern comprises respective origami cell units, and wherein the origami crease pattern is defined by a group of vector size parameters corresponding to relative fold lengths associated with the respective origami cell units, a vector angle parameter corresponding to fold angles associated with the respective origami cell units, and a scalar cell height parameter;
   imprinting, by the system, the origami crease pattern onto a tangible medium, the imprinting comprising forming openings into the tangible medium at positions relative to the origami crease pattern; and
   activating, by the system in response to formation of an origami shape resulting from folding of the tangible medium based on the origami crease pattern, actuators implanted into the origami shape at the positions of the openings, resulting in movement of the origami shape.

2. The method of claim 1, wherein the input shape is a regular polygon, and wherein the generating comprises generating the origami crease pattern based on geometric properties of the regular polygon.

3. The method of claim 1, wherein the input shape is defined by a continuous line, and wherein the method further comprises:
   dividing, by the system, the continuous line into a series of linear segments, wherein the generating comprises generating the origami crease pattern based on defined properties of the series of linear segments.

4. The method of claim 3, wherein the defined properties of the series of linear segments comprise lengths of respective ones of the series of linear segments and angular differentials between respective consecutive ones of the series of linear segments.

5. The method of claim 1, wherein the respective origami cell units have respective cell configurations selected from a group of cell configurations, and wherein the generating comprises selecting the respective cell configurations from the group of cell configurations based on a tuning parameter.

6. The method of claim 1, wherein the shape parameters comprise a defined size of the input shape, and wherein the method further comprises:
   determining, by the system, the scalar cell height parameter as a function of the defined size of the input shape.

7. The method of claim 1, wherein the tangible medium is a paper sheet.

8. The method of claim 1, wherein the imprinting comprises engraving the origami crease pattern into a polyethylene terephthalate (PET) sheet.

9. The method of claim 8, wherein the PET sheet is a first PET sheet, and wherein the imprinting further comprises:
   engraving the origami crease pattern into a second PET sheet; and
   joining the first PET sheet and the second PET sheet via an adhesive layer positioned between the first PET sheet and the second PET sheet.

10. The method of claim 1, further comprising:
    receiving, by the system, the shape parameters via a graphical user interface.

11. The method of claim 1, wherein the actuators comprise an electrostatic actuator, and wherein the activating of the actuators comprises supplying electrical power to the electrostatic actuator.

12. The method of claim 1, wherein the actuators comprise a shape-memory alloy (SMA) coil actuator, and wherein the activating of the actuators comprises energizing the SMA coil actuator, resulting in a modification to a positional state of the origami shape.

13. A non-transitory machine-readable medium, comprising executable instructions that, when executed by a processor, facilitate performance of operations, comprising:
    generating, based on properties of an input shape, an origami crease pattern representative of the input shape, wherein the origami crease pattern comprises respective origami cell units, and wherein the origami crease pattern is defined by parameters comprising a group of vector length parameters corresponding to relative fold lengths of the respective origami cell units, a vector angle parameter corresponding to fold angles associated with the respective origami cell units, and a scalar cell dimension parameter that defines a spatial dimension of the respective origami cell units; and
    imprinting the origami crease pattern onto a tangible sheet, the imprinting comprising forming openings into the tangible sheet at positions relative to the origami crease pattern; and
    activating, in response to formation of an origami shape resulting from folding of the tangible sheet based on the origami crease pattern, actuators implanted into the origami shape at the positions of the openings, resulting in movement of the origami shape.

14. The non-transitory machine-readable medium of claim 13, wherein the actuators comprise a shape-memory alloy (SMA) coil actuator, and wherein the activating of the actuators comprises energizing the SMA coil actuator, resulting in a modification to a positional state of the origami shape.

15. A system, comprising:
    a processor; and
    a memory that stores executable instructions that, when executed by the processor, facilitate performance of operations, comprising:
      determining properties of a target shape;
      generating, based on the properties, an origami crease pattern representative of the target shape, the origami crease pattern comprising respective origami cell units and being defined by a group of first vector parameters corresponding to relative fold lengths of the origami cell units, a second vector parameter corresponding to fold angles of the origami cell units, and a scalar parameter corresponding to a height of the origami cell units;

rendering the origami crease pattern onto a tangible sheet, the rendering comprising forming openings into the tangible sheet at positions relative to the origami crease pattern; and in response to folding of the tangible sheet based on the origami crease pattern, resulting in an origami shape, activating actuators implanted into the origami shape at the positions of the openings, resulting in movement of the origami shape.

16. The system of claim 15, wherein the target shape is a regular polygon, and wherein the generating comprises generating the origami crease pattern based on geometric properties of the regular polygon.

17. The system of claim 15, wherein the target shape is bounded by a continuous line, and wherein the operations further comprise:

dividing the continuous line into linear segments;

determining lengths of respective ones of the linear segments; and determining angular differentials between respective consecutive ones of the linear segments, wherein the generating comprises generating the origami crease pattern based on the lengths and the angular differentials.

18. The system of claim 15, wherein the determining comprises receiving the properties of the target shape via a graphical user interface.

19. The non-transitory machine-readable medium of claim 13, wherein the actuators comprise an electrostatic actuator, and wherein the activating of the actuators comprises supplying electrical power to the electrostatic actuator.

20. The non-transitory machine-readable medium of claim 13, wherein the tangible sheet is composed of a material selected from a group of materials comprising paper and polyethylene terephthalate (PET).

* * * * *